(12) United States Patent
Kuroiwa

(10) Patent No.: US 9,015,161 B2
(45) Date of Patent: Apr. 21, 2015

(54) MISMATCH DETECTION SYSTEM, METHOD, AND PROGRAM

(75) Inventor: Yukiko Kuroiwa, Tokyo (JP)

(73) Assignee: NEC Corporation, Tokyo (JP)

( * ) Notice: Subject to any disclaimer, the term of this patent is extended or adjusted under 35 U.S.C. 154(b) by 242 days.

(21) Appl. No.: 13/639,729

(22) PCT Filed: Mar. 25, 2011

(86) PCT No.: PCT/JP2011/058370
§ 371 (c)(1),
(2), (4) Date: Oct. 5, 2012

(87) PCT Pub. No.: WO2011/129198
PCT Pub. Date: Oct. 20, 2011

(65) Prior Publication Data
US 2013/0031098 A1    Jan. 31, 2013

(30) Foreign Application Priority Data
Apr. 12, 2010    (JP) ................................ 2010-091230

(51) Int. Cl.
*G06F 17/30*    (2006.01)
*G06F 17/22*    (2006.01)
(Continued)

(52) U.S. Cl.
CPC ........ *G06F 17/2211* (2013.01); *G06K 9/00442* (2013.01); *G06F 17/2229* (2013.01); *G06F 17/2725* (2013.01); *G06F 8/10* (2013.01)

(58) Field of Classification Search
None
See application file for complete search history.

(56) References Cited

U.S. PATENT DOCUMENTS 7,130,837 B2 *   10/2006   Tsochantaridis et al. ....... 706/55
2010/0191748 A1 *  7/2010   Martin et al. ................. 707/750

FOREIGN PATENT DOCUMENTS

JP    5-119987 A    5/1993
JP    2008-310663 A    12/2008
(Continued)

OTHER PUBLICATIONS

Katsumi Tanaka, "A Knowledge-Based Method for Analyzing Specification Written by Natural Language", IPSJ SIG Notes, Sep. 10, 1992, pp. 81-89, vol. 92, No. 70.
(Continued)

*Primary Examiner* — Jay Morrison
(74) *Attorney, Agent, or Firm* — Sughrue Mion, PLLC

(57) ABSTRACT

A mismatch detection system includes: a statement unit extracting portion that extracts a set of statement units by dividing a given document, which is written in a natural language, into pieces; a statement constructing portion that constructs each statement as a combination of a context and specifics by sorting each of the statement units into the context, which indicate additional information of statements, and the specifics, which indicate information of the statements; and a data generating portion that generates a data set obtained by merging a set of predetermined check specifics and a set of the statements generated by the statement constructing portion. A clustering portion converts two most similar pieces of data in the generated data set into one new piece of data which is generated by linking the most similar two pieces of data, repeats the conversion to generate a new data set, and extracts, from the generated new data set, only pieces of data that contain the statements generated by the statement constructing portion, to thereby generate a clustering result set. The mismatch detection system further includes a detection portion that generates a check item for each combination of a predetermined check subject and check specifics, and detects a mismatch of the statements based on a degree of similarity between the generated check item and a clustering result.

9 Claims, 15 Drawing Sheets

(51) Int. Cl.
*G06K 9/00* (2006.01)
*G06F 17/27* (2006.01)
*G06F 9/44* (2006.01)

(56) References Cited

FOREIGN PATENT DOCUMENTS

| | | |
|---|---|---|
| JP | 2009-75681 A | 4/2009 |
| JP | 2009-116648 A | 5/2009 |

OTHER PUBLICATIONS

Katsumi Tanaka et al., "Understanding Specifications Written in Natural Language", Toshiba Review, Jun. 1, 1993, pp. 467-470, vol. 48, No. 6.

Atsushi Onishi et al., ":Techniques of Artificial Intelligence in Requirements Engineering", Journal of Japanese Society for Artificial Intelligence, Nov. 1, 2009, pp. 898-905, vol. 24, No. 6.

* cited by examiner

| STATEMENT UNIT ID | STATEMENT UNIT |
|---|---|
| 1 | SERVER REQUIREMENTS |
| 2 | (1) AUTHENTICATION SERVER |
| 3 | PERFORM AUTHENTICATION |
| 4 | (2) CALCULATION SERVER |
| 5 | TWO SERVERS ARE PROVIDED TO CONSTITUTE LOAD BALANCING CONFIGURATION AND USE ROUND-ROBIN METHOD |
| 6 | CALCULATE AFTER AUTHENTICATION |
| 7 | (3) PROCESSING SERVER |
| 8 | USE ROUND-ROBIN METHOD AS IN CALCULATION SERVER |
| 9 | PROCESS AFTER CALCULATION |
| 10 | (4) OPERATION MANAGEMENT SERVER |
| 11 | ONE SERVER IS PROVIDED TO CONSTITUTE SINGLE CONFIGURATION |
| 12 | PERFORM OPERATION MANAGEMENT |

FIG. 2

| STATEMENT ID | CONTEXT | SPECIFICS |
|---|---|---|
| 1 | (1) AUTHENTICATION SERVER | PERFORM AUTHENTICATION |
| 2 | (2) CALCULATION SERVER | TWO SERVERS ARE PROVIDED TO CONSTITUTE LOAD-BALANCING CONFIGURATION AND USE ROUND-ROBIN METHOD |
| 3 | (2) CALCULATION SERVER | CALCULATE AFTER AUTHENTICATION |
| 4 | (3) PROCESSING SERVER | USE ROUND-ROBIN METHOD AS IN CALCULATION SERVER |
| 5 | (3) PROCESSING SERVER | PROCESS AFTER CALCULATION |
| 6 | (4) OPERATION MANAGEMENT SERVER | ONE SERVER IS PROVIDED TO CONSTITUTE SINGLE CONFIGURATION |
| 7 | (4) OPERATION MANAGEMENT SERVER | PERFORM OPERATION MANAGEMENT |

FIG. 3

| CHECK ID | CHECK SPECIFICS | COMPLETENESS | NON-CONTRADICTORINESS | UNAMBIGUOUSNESS |
|---|---|---|---|---|
| 1 | SERVERS ARE LOAD-BALANCING, ACTIVE/STANDBY SERVERS | 1 | 1 | |
| 2 | SERVER IS SINGLE SERVER | 1 | 1 | |

FIG. 4

| DATA ID | DATA | DOCUMENT ID |
|---|---|---|
| 1 | SERVERS ARE LOAD-BALANCING, ACTIVE/STANDBY SERVERS | 1 |
| 2 | SERVER IS SINGLE SERVER | 1 |
| 3 | (1) AUTHENTICATION SERVER: PERFORM AUTHENTICATION | 2 |
| 4 | (2)CALCULATION SERVER: TWO SERVERS ARE PROVIDED TO CONSTITUTE LOAD-BALANCING CONFIGURATION AND USE ROUND-ROBIN METHOD | 2 |
| 5 | (2) CALCULATION SERVER: CALCULATE AFTER AUTHENTICATION | 2 |
| 6 | (3) PROCESSING SERVER: USE ROUND-ROBIN METHOD AS IN CALCULATION SERVER | 2 |
| 7 | (3) PROCESSING SERVER: PROCESS AFTER CALCULATION | 2 |
| 8 | (4) OPERATION MANAGEMENT SERVER: ONE SERVER IS PROVIDED TO CONSTITUTE SINGLE CONFIGURATION | 2 |
| 9 | (4) OPERATION MANAGEMENT SERVER: PERFORM OPERATION MANAGEMENT | 2 |

FIG. 5

| ID | TYPIFICATION RESULT | DOCUMENT ID |
|---|---|---|
| 1 | SERVER IS SINGLE SERVER (4) OPERATION MANAGEMENT SERVER: ONE SERVER IS PROVIDED TO CONSTITUTE SINGLE CONFIGURATION | 1,2 |
| 2 | (1) AUTHENTICATION SERVER: PERFORM AUTHENTICATION | 2 |
| 3 | (2)CALCULATION SERVER: TWO SERVERS ARE PROVIDED TO CONSTITUTE LOAD-BALANCING CONFIGURATION AND USE ROUND-ROBIN METHOD (3) PROCESSING SERVER: USE ROUND-ROBIN METHOD AS IN CALCULATION SERVER | 2 |
| 4 | (2) CALCULATION SERVER: CALCULATE AFTER AUTHENTICATION | 2 |
| 5 | (3) PROCESSING SERVER: PROCESS AFTER CALCULATION | 2 |
| 6 | (4) OPERATION MANAGEMENT SERVER: PERFORM OPERATION MANAGEMENT | 2 |

SERVER REQUIREMENTS
AUTHENTICATION SERVER PERFORMS AUTHENTICATION. CALCULATION SERVERS ARE TWO SERVERS THAT CONSTITUTE LOAD-BALANCING CONFIGURATION AND USE ROUND-ROBIN METHOD. CALCULATION SERVER CALCULATES AFTER AUTHENTICATION. PROCESSING SERVER USES ROUND-ROBIN METHOD AS IN CALCULATION SERVER. PROCESSING SERVER PROCESSES AFTER CALCULATION. OPERATION MANAGEMENT SERVER IS ONE SERVER THAT CONSTITUTES SINGLE CONFIGURATION. OPERATION MANAGEMENT SERVER PERFORMS OPERATION MANAGEMENT.

FIG. 8

| STATEMENT UNIT ID | STATEMENT UNIT |
|---|---|
| 1 | SERVER REQUIREMENTS |
| 2 | AUTHENTICATION SERVER PERFORMS AUTHENTICATION |
| 3 | CALCULATION SERVERS ARE TWO SERVERS THAT CONSTITUTE LOAD-BALANCING CONFIGURATION AND USE ROUND-ROBIN METHOD |
| 4 | CALCULATION SERVER CALCULATES AFTER AUTHENTICATION |
| 5 | PROCESSING SERVER USES ROUND-ROBIN METHOD AS IN CALCULATION SERVER |
| 6 | PROCESS AFTER CALCULATION |
| 7 | OPERATION MANAGEMENT SERVER IS ONE SERVER THAT CONSTITUTES SINGLE CONFIGURATION |
| 8 | OPERATION MANAGEMENT SERVER PERFORMS OPERATION MANAGEMENT |

FIG. 9

| REPRESENTATIVE PHRASE | PHRASE 1 | PHRASE 2 | ... |
|---|---|---|---|
| KAYOSEI | AVAILABILITY | | |
| TAI SYOGAI SEI | FAULT TOLERANCE | KOSYO KYOYO SEI | |
| | TONIKAKU | | |

| CHECK ID | CHECK SPECIFICS | COMPLETE-NESS | NON-CONTRADIC-TORINESS | UNAMBIGU-OUSNESS |
|---|---|---|---|---|
| 1 | COMPATIBLE WITH FUNCTIONS TO BE ADDED IN FUTURE | | | 1 |
| 2 | MUST BE USER-FRIENDLY | | | 2 |

| STATEMENT UNIT ID | STATEMENT UNIT | DOCUMENT ID |
|---|---|---|
| 1 | (1) AUTHENTICATION SERVER | 1 |
| 2 | AUTHENTICATE USER WITHOUT DETERIORATING RESPONSE EVEN WHEN HEAVILY ACCESSED | 1 |
| 3 | (2) CALCULATION SERVER | 1 |
| 4 | TWO SERVERS ARE PROVIDED TO CONSTITUTE LOAD-BALANCING CONFIGURATION, AND CALCULATION IS PERFORMED AFTER AUTHENTICATION | 1 |
| 5 | (3) OPERATION MANAGEMENT SERVER | 1 |
| 6 | ONE SERVER IS PROVIDED TO CONSTITUTE SINGLE CONFIGURATION, AND OPERATION MANAGEMENT IS PERFORMED | 1 |
| 7 | POINTS OF PROPOSAL | 2 |
| 8 | TWO AUTHENTICATION SERVERS ARE PREPARED TO CONSTITUTE LOAD-BALANCING CONFIGURATION | 2 |
| 9 | THIS MAKES IT POSSIBLE TO DEAL WITH ○ ACCESSES/MINUTE AT PROBABILITY OF △% | 2 |
| 10 | TWO CALCULATION SERVERS ARE PROVIDED TO CONSTITUTE LOAD-BALANCING CONFIGURATION, AND CALCULATION IS PERFORMED AFTER AUTHENTICATION | 2 |
| 11 | TWO OPERATION MANAGEMENT SERVERS ARE PROVIDED TO CONSTITUTE LOAD-BALANCING CONFIGURATION, AND ARE USED FOR OPERATION MANAGEMENT | 2 |

FIG. 19

| STATEMENT UNIT ID | CONTEXT | SPECIFICS | DOCUMENT ID |
|---|---|---|---|
| 1 | (1) AUTHENTICATION SERVER | AUTHENTICATE USER WITHOUT DETERIORATING RESPONSE EVEN WHEN HEAVILY ACCESSED | 1 |
| 2 | (2) CALCULATION SERVER | TWO SERVERS ARE PROVIDED TO CONSTITUTE LOAD-BALANCING CONFIGURATION, AND CALCULATION IS PERFORMED AFTER AUTHENTICATION | 1 |
| 3 | (3) OPERATION MANAGEMENT SERVER | ONE SERVER IS PROVIDED TO CONSTITUTE SINGLE CONFIGURATION, AND OPERATION MANAGEMENT IS PERFORMED | 1 |
| 4 | POINT OF PROPOSAL | TWO AUTHENTICATION SERVERS ARE PREPARED TO CONSTITUTE LOAD-BALANCING CONFIGURATION | 2 |
| 5 | POINT OF PROPOSAL | THIS MAKES IT POSSIBLE TO DEAL WITH ○ ACCESSES/MINUTE AT PROBABILITY OF △% | 2 |
| 6 | POINT OF PROPOSAL | TWO CALCULATION SERVERS ARE PROVIDED TO CONSTITUTE LOAD-BALANCING CONFIGURATION, AND CALCULATION IS PERFORMED AFTER AUTHENTICATION | 2 |
| 7 | POINT OF PROPOSAL | TWO OPERATION MANAGEMENT SERVERS ARE PROVIDED TO CONSTITUTE LOAD-BALANCING CONFIGURATION, AND ARE USED FOR OPERATION MANAGEMENT | 2 |

| REPRESENTATIVE PHRASE | CONVERSION PHRASE 1 | SYNONYMOUS PHRASE 2 | |
|---|---|---|---|
| LOAD BALANCING | WITHOUT DETERIORATING RESPONSE | PREVENT DETERIORATION IN RESPONSE | ... |
| | POINTS OF PROPOSAL | DESCRIPTION OF PROPOSAL SPECIFICS | ... |

FIG. 23

| DATA ID | DATA | DOCUMENT ID |
|---|---|---|
| 1 | (1) AUTHENTICATION SERVER: LOAD IS BALANCED AND USER IS AUTHENTICATED EVEN WHEN HEAVILY ACCESSED | 1 |
| 2 | (2) CALCULATION SERVER: TWO SERVERS ARE PROVIDED TO CONSTITUTE LOAD-BALANCING CONFIGURATION, AND CALCULATION IS PERFORMED AFTER AUTHENTICATION | 1 |
| 3 | (3) OPERATION MANAGEMENT SERVER: ONE SERVER IS PROVIDED TO CONSTITUTE SINGLE CONFIGURATION, AND OPERATION MANAGEMENT IS PERFORMED | 1 |
| 4 | : TWO AUTHENTICATION SERVERS ARE PREPARED TO CONSTITUTE LOAD-BALANCING CONFIGURATION | 2 |
| 5 | : THIS MAKES IT POSSIBLE TO DEAL WITH ◊ACCESSES/MINUTE AT PROBABILITY OF Δ% | 2 |
| 6 | : TWO CALCULATION SERVERS ARE PROVIDED TO CONSTITUTE LOAD-BALANCING CONFIGURATION, AND CALCULATION IS PERFORMED AFTER AUTHENTICATION | 2 |
| 7 | : TWO OPERATION MANAGEMENT SERVERS ARE PROVIDED TO CONSTITUTE LOAD-BALANCING FUNCTION, AND ARE USED FOR OPERATION MANAGEMENT | 2 |

MISMATCH DETECTION SYSTEM, METHOD, AND PROGRAM

CROSS REFERENCE TO RELATED APPLICATIONS

This application is a National Stage of International Application No. PCT/JP2011/058370 filed on Mar. 25, 2011, which claims priority from Japanese Patent Application No. 2010-091230, filed on Apr. 12, 2010, the contents of all of which are incorporated herein by reference in their entirety.

TECHNICAL FIELD

This invention relates to document mismatch detection, and more particularly, to mismatch detection for detecting missed or omitted requirements from a document that describes requirements.

BACKGROUND ART

Missed or omitted requirements in system development means a large correction cost incurred by a return for rework from subsequent steps, and the need to detect missed or omitted requirements early is therefore widely known. In conventional detection of missed or omitted requirements, a person visually checks for a problem in a document that describes requirements by looking over prepared check items. In the case where there are a source document and a response document such as a request for proposal (RFP) and a proposal in response to the RFP, or a proposal and specifications in response to the proposal, the person also visually checks whether or not the response document contains points that correspond to individual matters written in the source document. However, checking a voluminous document that contains duplicate statements is costly (in terms of labor cost and time), and has a problem in that an overlook may occur in the manual check.

To cope with this, a technology for performing formal verification by modeling a subject is disclosed in Patent Literature 1, with which whether or not there is a problem can be verified about a described matter. However, describing and deciphering are skills to be learned by a user over time. Another problem is that the verification is not precise if the conversion from a document which is a natural language to a formal description is incorrect.

Technologies for assisting formal verification are disclosed in Patent Literature 2, Patent Literature 3, Patent Literature 4, and others, but do not solve the problem of the necessity of learning in using the formal verification. A general document, too, is reviewed manually for contradictions and ambiguities in the document and, in the case where a new document is created from a source document, for a matter that is written in the source document and missed or omitted in the new document, and similarly has the problem of cost (labor cost and time) and an overlook in the manual check.

Prior Art Literatures

Patent Document 1: Japanese Unexamined Patent Application Publication (JP-A) No. 2008-310663
Patent Document 2: Japanese Unexamined Patent Application Publication (JP-A) No. 2009-116648
Patent Document 3: Japanese Unexamined Patent Application Publication (JP-A) No. 2009-075681
Patent Document 4: Japanese Unexamined Patent Application Publication (JP-A) No. Hei 5-119987

SUMMARY OF INVENTION

Problem to be Solved by the Invention

This invention aims to detect a document mismatch in a document that is written in a natural language without converting the document into other formats.

Means to Solve the Problem

According to an aspect of this invention, there is provided a mismatch detection system, including: a statement unit extracting portion that extracts a set of statement units by dividing a given document, which is written in a natural language, into pieces; a statement constructing portion that constructs each statement as a combination of a context and specifics by sorting each of the statement units into the context, which indicate additional information of statements, and the specifics, which indicate information of the statements; a data generating portion that generates a data set obtained by merging a set of predetermined check specifics and a set of the statements generated by the statement constructing portion; a clustering portion that converts two most similar pieces of data in the generated data set into one new piece of data which is generated by linking the two most similar pieces of data, repeats the conversion to generate a new data set, and extracts, from the generated new data set, only pieces of data that contain the statements generated by the statement constructing portion, to thereby generate a clustering result set; and a detection portion that generates a check item for each combination of a predetermined check subject and check specifics, and detects a mismatch of the statements based on a degree of similarity between the generated check item and a clustering result.

According to another aspect of this invention, there is provided a mismatch detection method, including: extracting a set of statement units by dividing a given document, which is written in a natural language, into pieces; constructing each statement as a combination of a context and specifics by sorting each of the statement units into the context, which indicate additional information of statements, and the specifics, which indicate information of the statements; generating a data set obtained by merging a set of predetermined check specifics and a set of the statements generated in the constructing of the each statement; converting two most similar pieces of data in the generated data set into one new piece of data which is generated by linking the two most similar pieces of data, repeating the conversion to generate a new data set, and extracting, from the generated new data set, only pieces of data that contain the statements generated in the constructing of the each statement, to thereby generate a clustering result set; and generating a check item for each combination of a predetermined check subject and check specifics, and detecting a mismatch of the statements based on a degree of similarity between the generated check item and a clustering result.

According to still another aspect of this invention, there is provided a mismatch detection program for causing a computer to execute: statement unit extracting processing of extracting a set of statement units by dividing a given document, which is written in a natural language, into pieces; statement constructing processing of constructing each statement as a combination of a context and specifics by sorting each of the statement units into the context, which indicate additional information of statements, and the specifics, which indicate information of the statements; data generating processing of generating a data set obtained by merging a set of predetermined check specifics and a set of the statements generated in the statement constructing processing; clustering processing of converting two most similar pieces of data in the generated data set into one new piece of data which is generated by linking the two most similar pieces of data, repeating the conversion to generate a new data set, and extracting, from the generated new data set, only pieces of data that contain the statements generated in the statement constructing processing, to thereby generate a clustering result set; and detection processing of generating a check item for each combination of a predetermined check subject and check specifics, and detecting a mismatch of the statements based on a degree of similarity between the generated check item and a clustering result.

Effect of the Invention

According to this invention, a document written in a natural language is input as it is, and a document mismatch can therefore be detected without converting the natural language into other formats.

Further, according to this invention, a source data set is converted into new data in which similar pieces of data are linked to calculate the degree of similarity with the use of data increased in information, and a mismatch is therefore detected with high precision.

BRIEF DESCRIPTION OF THE DRAWINGS

FIG. 2 is an explanatory diagram illustrating an example of statement units that are stored in a statement unit storing portion 100 of FIG. 1.

FIG. 3 is an explanatory diagram illustrating an example of statements that are stored in a statement storing portion 101 of FIG. 1.

FIG. 4 is an explanatory diagram illustrating an example of check specifics that are stored in a check specifics storing portion 102 of FIG. 1.

FIG. 5 is an explanatory diagram illustrating an example of a data set that is stored in a data storing portion 103 of FIG. 1.

FIG. 6 is an explanatory diagram illustrating an example of clustering results that are stored in a clustering result storing portion 104 of FIG. 1.

FIG. 8 is an explanatory diagram illustrating an example of the case where the maximum character count among lines is calculated in a statement unit extracting portion 105 of FIG. 1.

FIG. 9 is an explanatory diagram illustrating another example of statement units that are stored in the statement unit storing portion 100 of FIG. 1.

FIG. 19 is an explanatory diagram illustrating an example of statement units that are stored in a statement unit storing portion 400 of FIG. 18.

FIG. 20 is an explanatory diagram illustrating an example of statements that are stored in a statement storing portion 401 of FIG. 18.

FIG. 22 is an explanatory diagram illustrating an example of conversion phrases that are stored in the conversion phrase storing portion 300 of FIG. 18.

FIG. 23 is an explanatory diagram illustrating an example of a data set that is stored in the data storing portion 103 of FIG. 18.

EMBODIMENTS FOR CARRYING OUT THE INVENTION

A few embodiments in which this invention is applied to a mismatch detection system are described below. The mismatch detection system may be interpreted as a mismatch detection device.

(First Embodiment)

A mismatch detection system according to a first embodiment of this invention is described in detail with reference to the drawings. The mismatch detection system according to the first embodiment detects a mismatch when an input document does not satisfy completeness with respect to check specifics determined in advance. The description given here takes as an example the case where the input document is a request for proposal, a proposal, or specifications.

A request for proposal (RFP) is a document in which a contractee, such as a public office or a corporation, who orders an information system, an IT service, or the like requests proposals from an IT vendor who is a contractor taking the order. An RFP is also called a request for procurement, a request for bidding, a demand for proposal, an appeal for proposal, a wish for proposal, an invitation for proposal, a request for estimation, a demand to submit a proposal, and the like. An RFP describes concrete requirement items such as an outline, a purpose, necessary functions, a service level, and contract terms. A proposal is a document in which the IT vendor describes concrete proposal items. A proposal is also called a project plan, a project proposal, and the like. Concrete proposal items such as a purpose, an aim, means for implementing a function or a service level, and a development framework are written in a proposal.

Specifications are a document describing requirement items which are items to be fulfilled by the system or the service. Specifications are also called requirement specifications, a requirement definition document, a condition definition document, function specifications, design specifications, and the like. Requirement items agreed between the contractee and the contractor are written in specifications in an organized manner.

Figure 1:
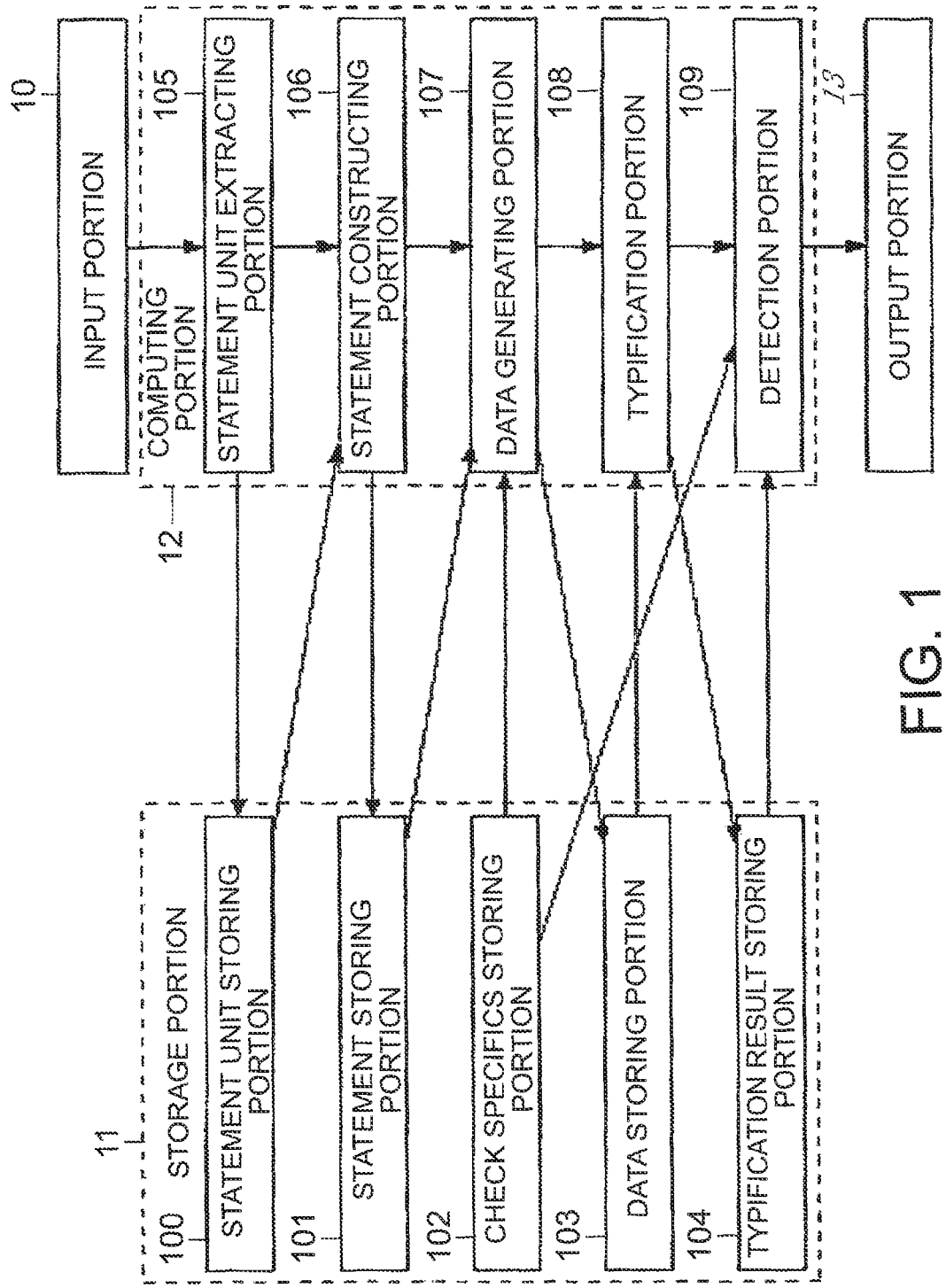
FIG. 1 is a block diagram illustrating a configuration example of a mismatch detection system according to a first embodiment of this invention.

Referring to FIG. 1, the mismatch detection system according to the first embodiment includes an input portion 10, which is a keyboard or the like, a storage portion 11 that stores information, a computing portion 12, which operates under control of a program, and an output portion 13, which is a display, a printer, or others.

The storage portion 11 includes a statement unit storing portion 100, a statement storing portion 101, a check specifics storing portion 102, a data storing portion 103, and a clustering result storing portion 104.

The statement unit storing portion 100 stores a statement unit. Herein, a statement unit refers to the unit of an expression that expresses the meaning of a statement, and is a part of a sentence, itemized writing, heading, or a drawing. To give a concrete example, the statement unit is a part of a sentence such as ". . . is input.", itemized writing such as ". . . being input", the heading of a chapter such as "1. Introduction", the heading of a drawing or a table such as "FIG. 1: a block diagram of the first embodiment", a drawing such as "input unit 10" or "conversion phrase storing portion".

FIG. 2 is an explanatory diagram illustrating an example of statement units that are stored in the statement unit storing portion 100. As illustrated in FIG. 2, a statement unit is stored together with a statement unit ID, which indicates a statement unit number.

The statement storing portion 101 stores a statement as a combination of specifics and a context. A context is, for example, the heading of a chapter or a section, or the title of a drawing or a table. A statement is an expression that expresses one complete meaning. A statement refers to each requirement item in an RFP, each proposal item in a proposal, and each requirement item in specifications.

FIG. 3 is an explanatory diagram illustrating an example of statements that are stored in the statement storing portion 101. As illustrated in FIG. 3, a statement is stored as a combination of a context and specifics. FIG. 3 is an example of statements constructed from FIG. 2. A context that does not have corresponding specifics is deleted as described later, and "server requirements" of FIG. 1 is therefore deleted.

The check specifics storing portion 102 stores check specifics determined in advance.

FIG. 4 is an explanatory diagram illustrating an example of check specifics that are stored in the check specifics storing portion 102. FIG. 4 is an example of server requirements which are each stored as a combination of a check ID, check specifics, and a check method. Check specifics may be a sentence or a list of keywords. Examples of the check method given here are completeness, inconsistency, and unambiguousness, but other methods may be set.

The data storing portion 103 stores a data set obtained by merging a set of check specifics stored in the check specifics storing portion 102 and a set of statements stored in the statement storing portion 101.

FIG. 5 is an explanatory diagram illustrating an example of a data set that is stored in the data storing portion 103. As illustrated in FIG. 5, data is stored as, for example, a combination of a data ID, which indicates a data number, data specifics, and a document ID, which indicates a document number. The document ID is, for example, 1 when the data is check specifics and 2 when the data is a statement.

The clustering result storing portion 104 stores results of typifying data.

FIG. 6 is an explanatory diagram illustrating an example of clustering results that are stored in the clustering result storing portion 104. As illustrated in FIG. 6, a clustering result is stored as, for example, a combination of an ID indicating a clustering result number, a clustering result, and a document ID. As a result of clustering of FIG. 5, data 2 and data 8 which are similar are converted into the same data, and other pieces of data than data 1 are extracted as statement-containing data. Clustering results of FIG. 6 are consequently stored.

The computing portion 12 includes a statement unit extracting portion 105, a statement constructing portion 106, a data generating portion 107, a clustering portion 108, and a detection portion 109.

The statement unit extracting portion 105 formats a document input via the input portion 10, divides the document into pieces to extract statement units, and stores the statement units in the statement unit storing portion 100.

The statement constructing portion 106 sorts statement units into statement specifics and contexts, constructs a statement as a combination of specifics and a context immediately preceding the specifics, and stores the statement in the statement storing portion 101.

The data generating portion 107 generates a data set obtained by merging statements stored in the statement storing portion 101 and check specifics stored in the check specifics storing portion 102, and stores the data set in the data storing portion 103.

The clustering portion 108 converts two most similar pieces of data among pieces of data stored in the data storing portion 103 into one new piece of data which is generated by linking those two pieces of data, repeats the conversion until the degree of similarity between the stored pieces of data becomes smaller than a first threshold value determined in advance, to thereby generate a new data set. From the generated new data set, the clustering portion 108 extracts only pieces of data that contain statements generated by the statement constructing portion 106 to generate a clustering result set, and stores the generated clustering result set in the clustering result storing portion 104.

The detection portion 109 calculates the degree of similarity of a combination of a predetermined check subject and check specifics indicating completeness that are stored in the check specifics storing portion 102 to a clustering result stored in the clustering result storing portion 104. The detection portion 109 detects a mismatch based on the calculated degree of similarity and outputs the detection result to the output portion 13.

Figure 7:
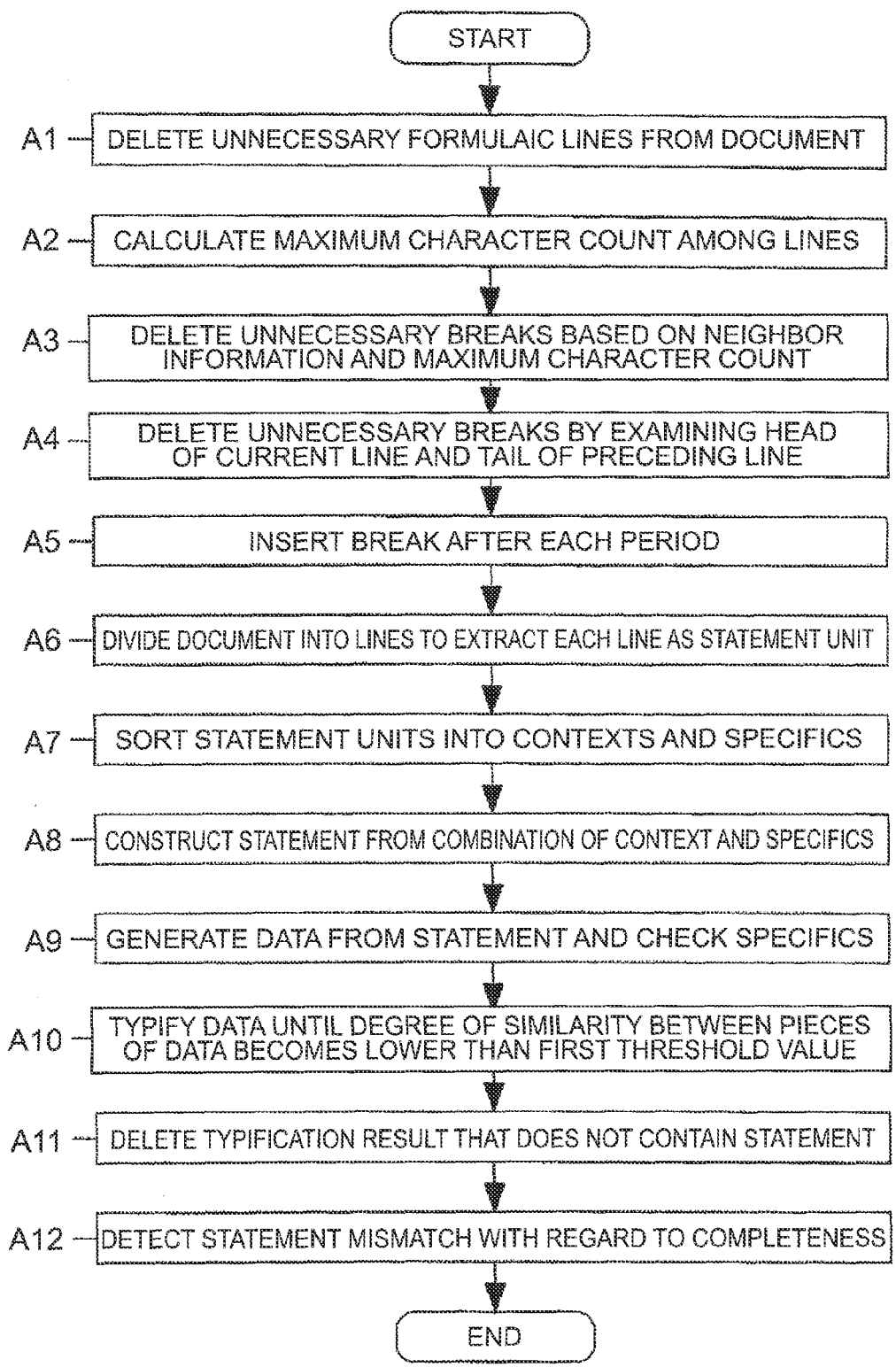
FIG. 7 is a flow chart illustrating an example of the progress of processing in the mismatch detection system according to the first embodiment of this invention.

The overall operation according to the first embodiment is described in detail with reference to a flow chart of FIG. 7 in addition to FIG. 1.

When a document such as a request for proposal (RFP), a proposal, or specifications is input in a text format via the input portion 10, the statement unit extracting portion 105 first removes unnecessary formulaic lines in the document (Step A1). Herein, an unnecessary formulaic line refers to an empty line or a line indicating a page number. A line indicating a page number is, for example, a line holding only a number or has a "-number-" style in which a number is sandwiched between hyphens. A character string written in every page of the document, such as "Copyright . . ." or "All rights reserved.", a corporation name, or a date is also deleted if there is any. Those character strings to be deleted may be specified by a user of the system through an input via the input portion 10 which is a keyboard or the like, or may be stored in the system by default, or may be specified in other manners.

The statement unit extracting portion 105 calculates the maximum character count among lines (Step A2). The Japanese language discriminates a half-width character and a full-width character, and to calculate the maximum character count among general lines which have mostly full-width characters, a character count is deemed as the maximum character count when a document contains a given proportion of lines that have that character count or higher. The given proportion is, for example, 1% of the total line count.

FIG. 8 is an explanatory diagram illustrating an example of the case where the maximum character count among lines is calculated in the statement unit extracting portion 105. FIG. 8 is a part of a document that contains 101 lines or more. In the case of the document of FIG. 8 which has a sentence format and has a break for each line, the first line has five characters, the second to fifth lines and the seventh line each have twenty-five characters, the sixth line has twenty-six characters, and the eighth line has five characters. The maximum character count is 26 but only one line has twenty-six characters and its proportion does not reach 1% or higher. The statement unit extracting portion 105 therefore calculates the maximum character count as 25.

The statement unit extracting portion 105 examines for each line the character counts of neighbor lines to delete an unnecessary break (Step A3). The neighbor lines are, for example, five lines. In the case where the character counts of one line and its neighbor lines are substantially equal to the maximum character count, breaks between the lines are deleted. The character counts of one line and its neighbor lines are substantially equal to the maximum character count when the character counts of the line itself and three of the five neighbor lines are within ±3 characters of the maximum character count. Those conditions may be specified by the user of the system through an input via the input portion 10 which is a keyboard or the like, or may be stored in the system by default, or may be specified in other manners. In FIG. 8, the first line has five characters and the break of the first line is not deleted because the character count of the first line itself is not within ±3 characters of the maximum character count. The character counts of the second line, which has twenty-five characters, and the third to fifth lines, which have twenty-five or twenty-six characters, are within ±3 characters of the maximum character count, and the break of the second line is therefore deleted. The break of the third line is deleted as well because the character counts of itself and the second and fourth to sixth lines are within ±3 characters of the maximum character count. The breaks of the fourth line, the fifth line, and the sixth line are similarly deleted. The break of the seventh line in which the character count is low as in the first line is not deleted. In the case where a document contains a table, unnecessary breaks may be deleted by the same method with the use of the maximum character count among neighbor lines, instead of the maximum character count among lines of the entire document.

The statement unit extracting portion 105 examines for each line whether or not linking the tail of the preceding line and the head of the line in question creates a word and, when the linking creates a word, deletes the break at the tail of the preceding line as an unnecessary break (Step A4). Whether the linking creates a word can be examined by performing a common morphological analysis and determining whether the tail and the head can be divided into one word. Morphological analysis can be performed with, for example, a morphological analysis engine such as Mecab or Chasen. Morphological analysis is, for example to select, from an input text "Tokyo-to ni iru (be in Tokyo)", an output series of morphemes "tokyo", "to", "ni", and "iru". Another example of the output series is "to", "kyoto", "ni", and "iru". In morphological analysis, general documents are prepared in a large amount to obtain, from these documents, for each morpheme such as a noun or a verb, an appearance frequency score and a link likelihood score, and a dividing method that yields the highest score is selected for an input text. For example, "tokyo" and "to" are linked more often in a large amount of general documents than the case where "to" and "kyoto" are linked. The likelihood score of the link between "tokyo" and "to" is therefore higher than the likelihood score of the link between "to" and "kyoto", and an output series that divides the input text "Tokyo-to ni iru" into morphemes "tokyo", "to", "ni", and "iru" is consequently obtained. Here, morphological analysis is conducted after the tail of the preceding line and the head of the line in question are linked and, in the case where the tail of the preceding line and the head of the line in question form a word, the break of the preceding line is deleted. For example, in the case of the fourth line of FIG. 8, if the break of the third line which has actually been deleted in Step A3 is not deleted, linking the tail of the preceding line and the head of the line in question yields ". . . keisan sāba deha, . . ." ("in calculation server"), which is divided into a noun "sāba" ("server") through morphological analysis. The tail of the preceding line and the head of the line in question thus form a word, and the break of the third line which is the preceding line is consequently deleted. Similarly, if the break of the seventh line which has actually been deleted is not deleted, linking the tail of the preceding line and the head of the line in question, namely, the eighth line, yields ". . . unyō kanri wo . . ." ("operation management"), which is divided into a noun "kanri" ("management") through morphological analysis, and the break of the seventh line is consequently deleted.

The statement unit extracting portion 105 inserts a break after each period (or point) (Step A5). The period is represented by "." or "。".

The statement unit extracting portion 105 next divides the document into lines to store each line as a statement unit in the statement unit storing portion 100 (Step A6).

FIG. 9 is an explanatory diagram illustrating another example of statement units that are stored in the statement unit storing portion 100. FIG. 9 illustrates statement units extracted from the document of FIG. 8. In the document of FIG. 8, unnecessary breaks have been deleted in Step A3, which leaves "server requirements" as the first line and the rest as the second line. No breaks are deleted in Step A4, and a break is inserted after each period in Step A5, thereby creating eight lines, which constitute the statement units of FIG. 9 in Step A6. In order to improve the analysis precision, statement units stored in the statement unit storing portion 100 may be output to the output portion 13 so that the user of the system can check the result of division into statement units and correct errors if there are any.

Next, the statement constructing portion 106 sorts statement units into contexts and specifics (Step A7). A context is, for example, the heading of a chapter, a section, a paragraph, a drawing, a table, or the like. The statement constructing portion 106 determines whether a statement unit is the heading of a chapter, a section, a drawing, a table, or the like based on the presence/absence of a verb in the statement unit. For example, in the case of requirement units of FIG. 2, the statement constructing portion 106 sorts a statement unit that has a statement unit ID "1" (referred to as statement unit 1) and does not contain a verb as a context, a statement unit 2 which, too, does not contain a verb as a context, and a statement unit 3 which contains a verb as specifics. The statement constructing portion 106 similarly sorts statement units 4, 7, and 10 as contexts and statement units 5, 6, 8, 9, 11, and 12 as specifics. In the case of FIG. 9, the statement constructing portion 106 sorts a statement unit 1 which does not contain a verb as a context, and the other statement units which contain a verb as specifics.

In another method of sorting statement units into contexts and specifics, a statement unit shorter than a predetermined character count may be sorted as a context and a statement unit equal to or longer than the predetermined character count may be sorted as specifics. Alternatively, when the head of a statement unit is a number, a combination of "dai" and a number (the combination indicates an ordinal number in Japanese), or a number sandwiched between quotation marks, for example, the number may be assumed as a chapter number, a section number, or a paragraph number, and a statement unit having a sequential chapter, section, or paragraph number that precedes this number may be sorted as a context which is a chapter or a section. The same applies to drawings and tables and, when the head of a statement unit is "figure" or "table" followed by a number or an alphabet letter such as "A", the number may be assumed as a drawing number or a table number, and a statement unit having a sequential drawing or table number that precedes this number may be sorted as a context which is the heading of a drawing or a table.

The statement constructing portion 106 constructs a statement as a combination of specifics and the closest preceding context to store the statement in the statement storing portion 101 (Step A8). Statements constructed from statement units of FIG. 2 are as illustrated in FIG. 3. When there are no specifics associated with the former context of successive contexts, the statement constructing portion 106 deletes the relevant statement. For example, a statement 1 is deleted. A statement may be constructed from a combination of specifics and all contexts for the preceding specifics. For example, in the case of FIG. 2, the first statement may be a combination of "server requirements" and "(1) authentication server", which are contexts, and "perform authentication.", which is specifics.

Next, the data generating portion 107 generates data from a statement stored in the statement storing portion 101 and check specifics stored in the check specifics storing portion 102 to store the data in the data storing portion 103 (Step A9). Data of a statement is a character string obtained by linking the context and specifics of the statement with the use of a segmentation symbol determined in advance. The segmentation symbol may be specified by the user of the system through an input via the input portion 10 which is a keyboard or the like, or may be stored in the system by default, or may be specified in other manners. For example, in the case of statements of FIG. 3 and ":" is specified as the segmentation symbol, data of the statement 1 is "(1) authentication server: perform authentication.", and data of a statement 2 is "(2) calculation server: two servers are provided to constitute a load balancing configuration, and use round-robin method.". The segmentation symbol may be a "null". Data of check specifics is check specifics. For example, in the case of check specifics of FIG. 4, data of check specifics 1 is "servers are load-balancing, active/standby servers" and data of check specifics 2 is "server is single server". When a statement is a combination of specifics and all contexts for the preceding specifics, the first data may be "server requirements: (1) authentication server: perform authentication." in the case of FIG. 2.

Next, the clustering portion 108 converts two most similar pieces of data in a data set into one new data which is generated by linking these two pieces of data, repeats the conversion to generate a new data set, extracts only pieces of data containing statements that are stored in the data storing portion 103, and stores the extracted pieces of data in the clustering result storing portion 104 as a clustering result set (Step A10). The conversion to data is repeated until the degree of similarity between all pieces of data becomes greater than the first threshold value determined in advance. The first threshold value may be specified by the user of the system through an input via the input portion 10 which is a keyboard or the like, or may be stored in the system by default, or may be specified in other manners. For example, typifying the data 2 and the data 8, and the data 4 and the data 6 of FIG. 5 yields clustering results of FIG. 6. A method of calculating the degree of similarity for clustering may be specified by the user of the system through an input via the input portion 10 which is a keyboard or the like, or may be stored in the system by default, or may be specified in other manners. For example, the degree of similarity can be calculated based on the appearance frequencies of words extracted from text through morphological analysis. However, words "kousoku (high speed)" and "jinsoku (quick)" are not regarded as the same word, and require synonymous conversion to be regarded as the same word. The degree of similarity may also be calculated by a Kolmogorov complexity approximation algorithm.

For example, when an algorithm for compressing a subject is determined in advance and a compressed size of a subject i, a compressed size of a subject j, and a compressed size of a new subject obtained by linking the subject i and the subject j are given as $C(i)$, $C(j)$, and $C(ij)$, respectively, a degree of similarity $s(i, j)$ between the subject i and the subject j is calculated by, for example, a numerical expression of $d(i, j)=1-C(ij)/\{C(i)+C(j)\}$, or $d(i, j)=1-[C(ij)-\min\{C(i), C(j)\}]/\max\{C(i), C(j)\}$. The specified compression algorithm is, for example, gip or zgip. A compression algorithm encodes a character string in, for example, pairs of "match length-match point" of a match with a symbol that is a character or a preceding partial character string. In the encoding, the appearance count of a symbol in a character string is counted to assign, for example, a shorter code to a symbol that has a higher count. Accordingly, when a Kolmogorov complexity approximation algorithm is used to calculate the degree of similarity between a text "kousoku ni dousa (operate at high speed)" and a text "jinsoku ni dousa (operate quickly)", a short code is assigned to "soku ni dousa" and the calculated degree of similarity is high.

The clustering portion 108 examines sequentially clustering results stored in the clustering result storing portion 104 and, when there is a clustering result that contains none of the statements stored in the statement storing portion 101, deletes the clustering result from the clustering result storing portion 104 (Step A11).

Next, the detection portion 109 detects a statement mismatch in terms of completeness (Step A12). Detailed processing is described later. The detection portion 109 then ends the system operation.

Figure 10:
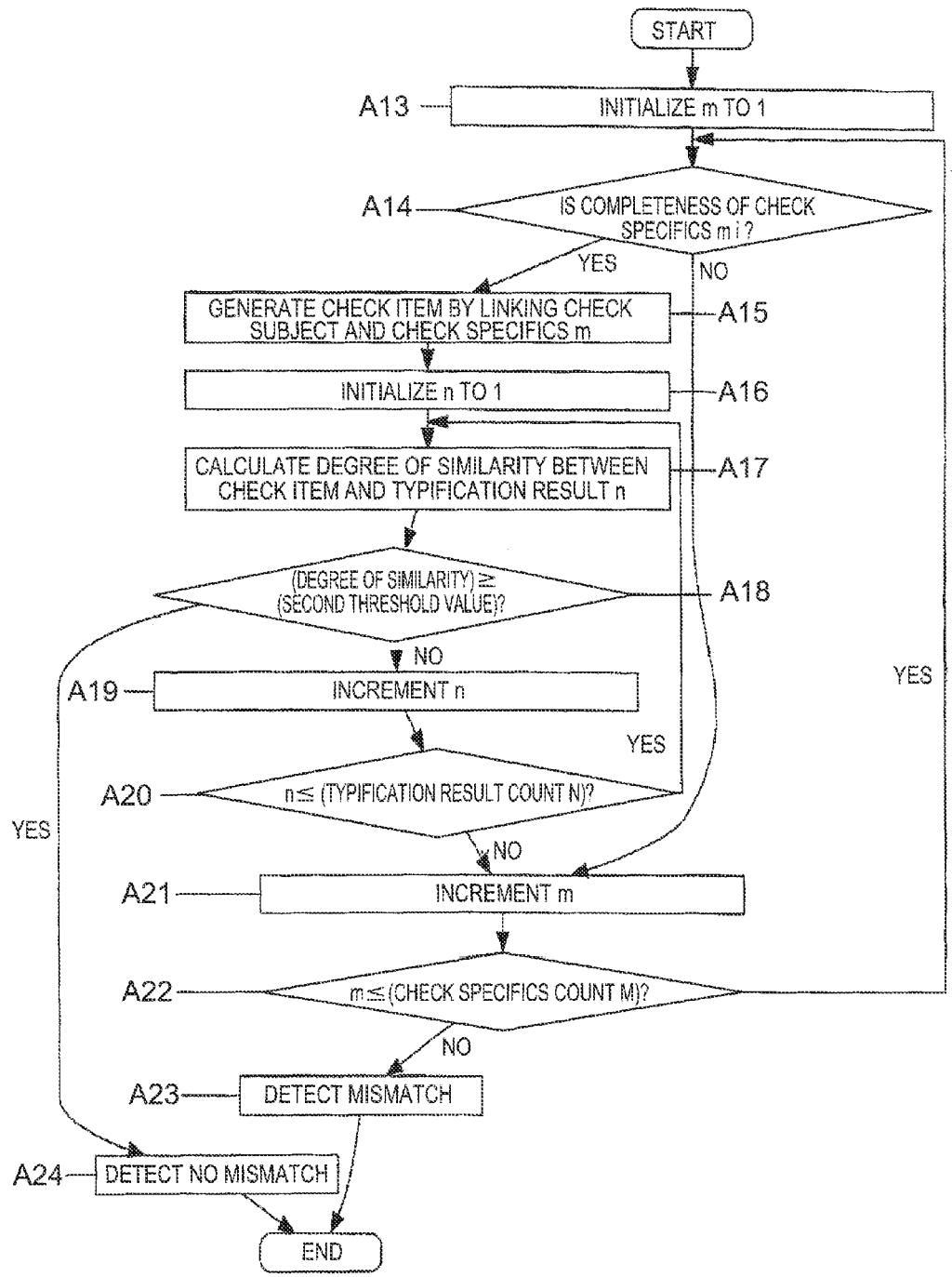
FIG. 10 is a flow chart illustrating an example of the progress of processing that is performed by a detection portion 109 with regard to completeness i of one check subject in the mismatch detection system according to the first embodiment of this invention.

A detailed description is given with reference to a flow chart of FIG. 10 in addition to FIG. 1 of the operation of the detection portion 109 with regard to a completeness i of one check subject according to the first embodiment.

The detection portion 109 first initializes m, which is a number indicating check specifics, to 1 (Step A13).

The detection portion 109 refers to the check specifics storing portion 102 to examine whether the completeness of the check specifics m is i (Step A14). The detection portion 109 moves to Step A15 when the completeness is i, and moves to Step A21 when the completeness is not i. For example, when i is 1 and m is 1, check specifics of FIG. 4 whose check ID is 1 have a completeness of 1, and the detection portion 109 therefore moves to Step A15.

The detection portion 109 generates a check item from a check subject and the check specifics m (Step A15). A check item is a character string obtained by linking a check subject and check specifics with the use of a predetermined segmentation symbol. The check subject may be specified by the user of the system through an input via the input portion 10 which is a keyboard or the like, or may be stored in the system by default, or may be specified in other manners. Default settings here are for automatic generation from a context. For example, when i is 1, m is 1, "authentication server" is specified as the check subject, and the predetermined segmentation symbol is ":", the check item which is a combination of a check subject and check specifics is "authentication server: servers are load-balancing, active/standby servers".

The detection portion 109 initializes n, which is a number indicating a clustering result, to 1 (Step A16).

The detection portion 109 next calculates the degree of similarity between the check item and the clustering result n (Step A17).

The detection portion 109 compares the degree of similarity against a second threshold value determined in advance (Step A18). The second threshold value may be specified by the user of the system through an input via the input portion 10 which is a keyboard or the like, or may be stored in the system by default, or may be specified in other manners. The degree of similarity to a clustering result is calculated because the analysis precision is low when the degree of similarity is calculated simply between a check item and a statement, which is about a sentence-long and too short to contain much information, but is improved by the processing of the clustering portion 108.

For example, "processing server" is specified as the check subject. From the data 4 of FIG. 5 which indicates that calculation servers employ load balancing and a round-robin method, and from the data 6 of FIG. 5, a person infers that the processing server which uses the round-robin method employs load balancing as well. However, with the data 6 of FIG. 5 alone which is not typified and which contains neither "single" nor "load balancing", it cannot be inferred that the processing server employs load balancing. In FIG. 6 which illustrates typified values, on the other hand, the clustering result 4 has a high degree of similarity to the check 1 which indicates load balancing, and it can be inferred that the processing server employs load balancing. The detection portion 109 moves to Step A24 when the degree of similarity is equal to or higher than the second threshold value, and moves to Step A19 when the degree of similarity is lower than the second threshold value.

In Step A19, the detection portion 109 increments n.

The detection portion 109 compares n against a clustering result count N (Step A20). The detection portion 109 moves to Step A17 when n is equal to or lower than N, and moves to Step A21 when n is higher than N.

In Step A21, the detection portion 109 increments m.

The detection portion 109 compares m against a check specifics count M (Step A22). The detection portion 109 moves to Step A14 when m is equal to or lower than M, and moves to Step A23 when m is higher than M.

The detection portion 109 detects a mismatch when m is higher than M (Step A23). For example, when "authentication server" is specified as a check subject, data "authentication server: servers are load-balancing, active/standby servers" and data "authentication server: server is single server" are obtained which are both similar to none of the clustering results of FIG. 6. This is because a description of check specifics with respect to the authentication server is lacking, and the detection portion 109 detects this as a mismatch. The detection result may be output immediately via the output portion 13 which is a display, a printer, or others, or may be stored to be output in response to a request from the user of the system or the like, or may be output in other manners. The detection portion 109 then ends the operation.

When the degree of similarity is equal to or higher than the second threshold value in Step A18, the detection portion 109 detects no mismatch in the next step (Step A24). For example, when "calculation server" is specified as a check subject, the degree of similarity of "calculation server: servers are load-balancing, active/standby servers" to each clustering result of FIG. 6 is calculated. The calculation reveals a high degree of similarity to a clustering result 3, which is "(2) calculation server: two servers are provided to constitute a load-balancing configuration and use round-robin method. (3) processing server: round-robin method is used as in calculation servers". The detection portion 109 therefore detects no mismatch. In the case where "operation management server" is specified as a check subject, the degree of similarity is high between data "operation management server: server is single server" and a clustering result 1, which is "server is single server (3) operation management server: single configuration". The detection portion 109 therefore detects no mismatch. The detection result may be output immediately via the output portion 13 which is a display, a printer, or others, or may be stored to be output in response to a request from the user of the system or the like, or may be output in other manners. The detection portion 109 may be instructed not to output "no mismatch" results. The detection portion 109 then ends the operation. Those processing steps of the detection portion 109 can be executed for every completeness i and every check subject suitable for the completeness i.

(Effects of the First Embodiment)

According to the first embodiment, when a document written in a natural language is input, the statement unit extracting portion and the statement constructing portion automatically construct a statement and detect a statement mismatch. This configuration has an effect in that a statement mismatch can be detected without manually converting the document into other formats.

In addition, whereas the analysis precision is low in a simple calculation of the degree of similarity of a statement, which is about a sentence-long and too short to contain much information, the first embodiment uses clustering to calculate the degree of similarity to a sentence in which a statement or check specifics are linked, and therefore is capable of high precision analysis.

In the example, it can be inferred that load balancing is employed if "round-robin method" is added to the check specifics 1, but a document generally contains business operation knowledge and special terms, making it impossible to specify all relevant phrases in advance. The first embodiment, however, has an effect in that the analysis can be conducted with high precision by using clustering, without specifying all relevant phrases in advance.

The first embodiment deals with mismatch detection in terms of completeness, and has an effect in that, by creating check items each of which links a check subject to check specifics and which ensure that the completeness is satisfied when one of the check items is written, no mismatch is detected when a document contains a statement corresponding to one of the check items, whereas a mismatch is detected when the document does not.

(Second Embodiment)

A detailed description is given with reference to the drawings of a mismatch detection system according to a second embodiment of this invention. The mismatch detection system according to the second embodiment detects a mismatch when an input document contains a contradiction to check specifics determined in advance. The description given here takes as an example the case where the input document is a request for proposal, a proposal, or specifications. Components that are the same as those in the first embodiment are denoted by the same reference numerals, and a detailed description thereof is omitted here.

Figure 11:
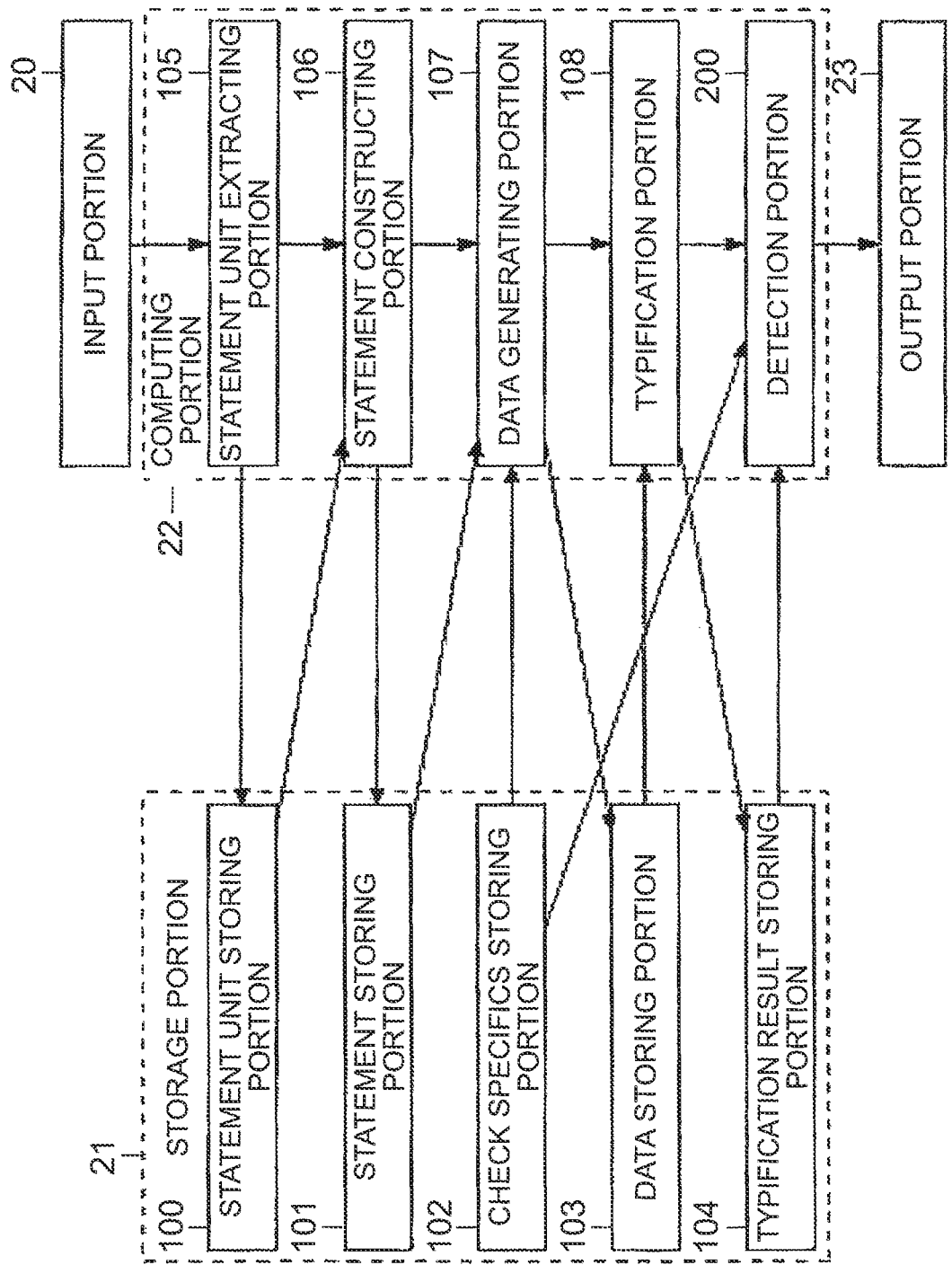
FIG. 11 is a block diagram illustrating a configuration example of a mismatch detection system according to a second embodiment of this invention.

Referring to FIG. 11, the mismatch detection system according to the second embodiment includes an input portion 20, which is a keyboard or the like, a storage portion 21 for storing information, a computing portion 22, which operates under control of a program, and an output portion 23, which is a display, a printer, or others.

The storage portion 21 includes the statement unit storing portion 100, the statement storing portion 101, the check specifics storing portion 102, the data storing portion 103, and the clustering result storing portion 104.

The statement unit storing portion 100, the statement storing portion 101, the check specifics storing portion 102, the data storing portion 103, and the clustering result storing portion 104 are the same as in the first embodiment.

The computing portion 22 includes the statement unit extracting portion 105, the statement constructing portion 106, the data generating portion 107, the clustering portion 108, and a detection portion 200.

The statement unit extracting portion 105, the statement constructing portion 106, the data generating portion 107, and the clustering portion 108 are the same as in the first embodiment.

The detection portion 200 calculates, for a combination of a predetermined check subject and check specifics indicating inconsistency which are stored in the check specifics storing portion 102, the degree of similarity to a clustering result stored in the clustering result storing portion 104, detects a mismatch based on the calculated degree of similarity, and outputs a detection result to the output portion 23.

Figure 12:
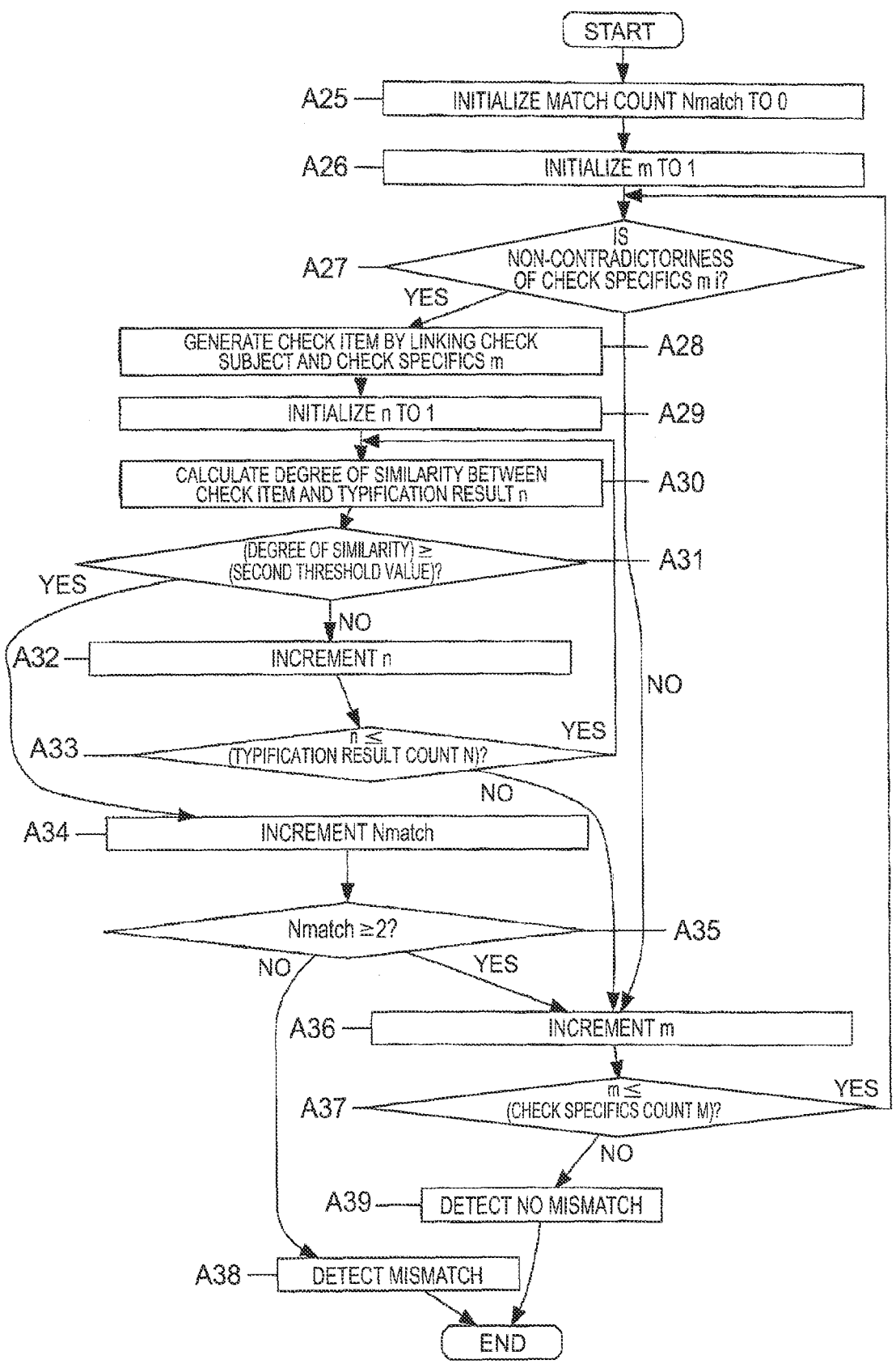
FIG. 12 is a flow chart illustrating an example of the progress of processing that is performed by a detection portion 200 with regard to inconsistency i of one check subject in the mismatch detection system according to the second embodiment of this invention.

A detailed description is given with reference to a flow chart of FIG. 12 in addition to FIG. 11 of the operation of the detection portion 200 with regard to inconsistency i of one check subject according to the second embodiment.

The detection portion 200 first initializes Nmatch, which is a number indicating the inconsistency match count, to 0 (Step A25).

The detection portion 200 initializes m, which is a number indicating check specifics, to 1 (Step A26).

The detection portion 200 next refers to the check specifics storing portion 102 to examine whether the inconsistency of the check specifics m is i (Step A27). The detection portion 200 moves to Step A28 when the inconsistency is i, and moves to Step A36 when the inconsistency is not i.

When the inconsistency is i, the detection portion 200 generates a check item from a check subject and the check specifics m (Step A28).

The detection portion 200 initializes n, which is a number indicating a clustering result, to 1 (Step A29).

The detection portion 200 next calculates the degree of similarity between the check item and the clustering result n (Step A30).

The detection portion 200 compares the degree of similarity against the second threshold value determined in advance (Step A31). The second threshold value may be specified by a user of the system through an input via the input portion 20 which is a keyboard or the like, or may be stored in the system by default, or may be specified in other manners. The detection portion 200 moves to Step A34 when the degree of similarity is equal to or higher than the second threshold value, and moves to Step A32 when the degree of similarity is lower than the second threshold value.

In Step A32, the detection portion 200 increments n.

The detection portion 200 compares n against the clustering result count N (Step A33). The detection portion 200 returns to Step A30 when n is equal to or lower than N, and moves to Step A36 when n is higher than N.

When the degree of similarity is equal to or higher than the second threshold value in Step A31, the detection portion 200 increments Nmatch (Step A34).

The detection portion 200 next examines whether the match count Nmatch is equal to or higher than 2 (Step A35). The detection portion 200 moves to Step A38 when Nmatch is equal to or higher than 2, and moves to Step A36 when Nmatch is lower than 2.

In Step A36, the detection portion 200 increments m.

The detection portion 200 compares m against the check specifics count M (Step A37). The detection portion 200 returns to Step A27 when m is equal to or lower than M, and moves to Step A39 when m is higher than M.

In Step A38, the detection portion 200 detects a mismatch. The detection result may be output immediately via the output portion 23 which is a display, a printer, or others, or may be stored to be output in response to a request from the user of the system or the like, or may be output in other manners. In order to show places where contradictions lie, the relevant check specifics m and clustering result n may be stored until all relevant check specifics and clustering results are output at the same time.

In Step A39, the detection portion 200 detects no mismatch. The detection result may be output immediately via the output portion 23 which is a display, a printer, or others, or may be stored to be output in response to a request from the user of the system or the like, or may be output in other manners. The detection portion 200 may be instructed not to output "no mismatch" results. The detection portion 200 then ends the operation performed on a check subject with regard to the inconsistency i. Those processing steps of the detection portion 200 can be executed for every inconsistency i and every check subject suitable for the inconsistency i.

(Effects of the Second Embodiment)

According to the second embodiment, an effect in that a statement mismatch can be detected with high precision without manually converting a document into other formats is obtained as in the first embodiment. The second embodiment deals with mismatch detection in terms of inconsistency, and has an effect in that a contradiction can be detected in check specifics which, when a plurality of sets of check specifics are written, may contradict with other check specifics.

(Third Embodiment)

A detailed description is given with reference to the drawings of a mismatch detection system according to a third embodiment of this invention. The mismatch detection system according to the third embodiment detects a mismatch when an input document contains an ambiguous place to check specifics determined in advance. The description given here takes as an example the case where the input document is a request for proposal, a proposal, or specifications. Components that are the same as those in the first (second) embodiment are denoted by the same reference numerals, and a detailed description thereof is omitted here.

Figure 13:
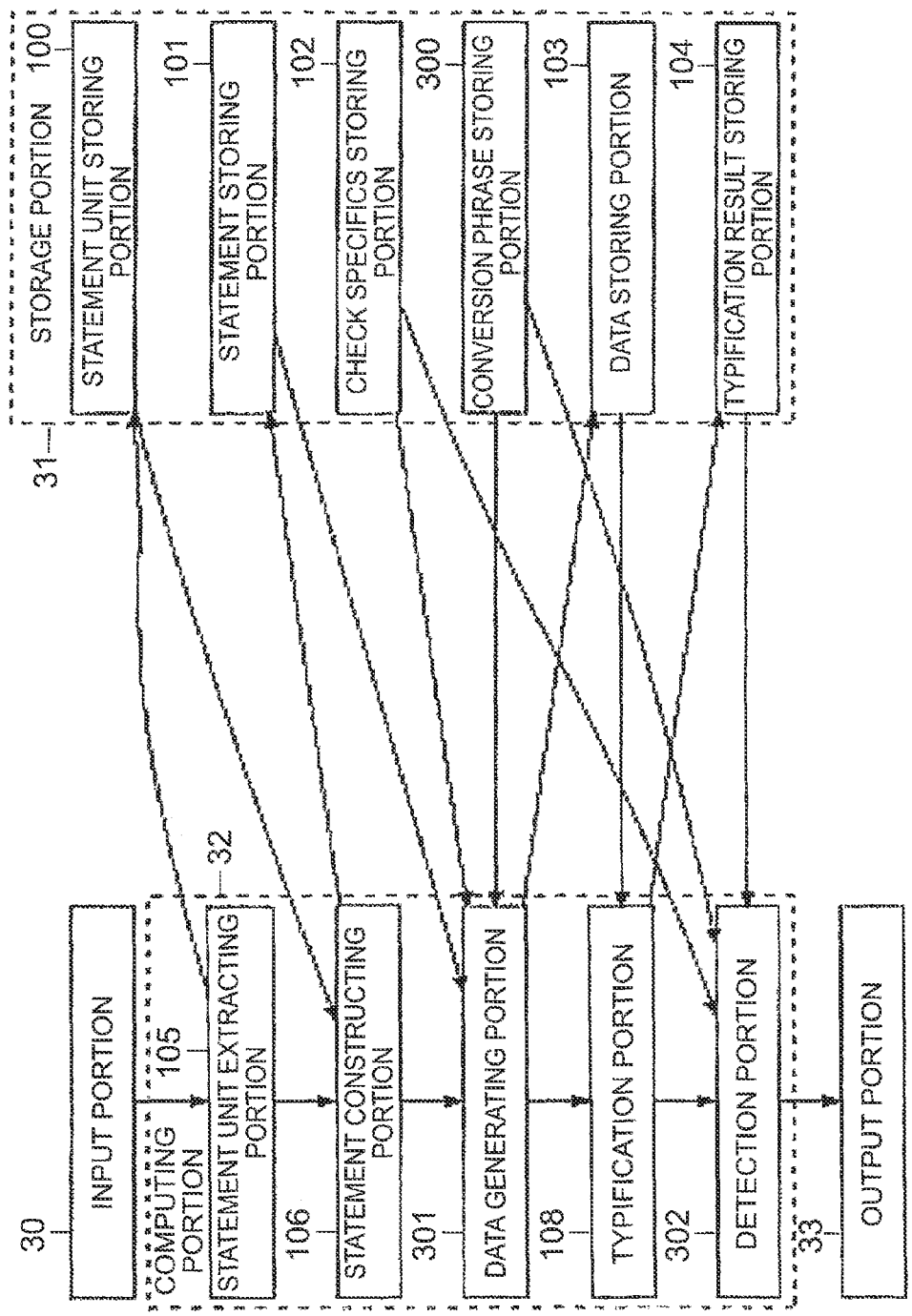
FIG. 13 is a block diagram illustrating a configuration example of a mismatch detection system according to a third embodiment of this invention.

Referring to FIG. 13, the mismatch detection system according to the third embodiment includes an input portion 30, which is a keyboard or the like, a storage portion 31 for storing information, a computing portion 32, which operates under control of a program, and an output portion 33, which is a display, a printer, or others.

The storage portion 31 includes the statement unit storing portion 100, the statement storing portion 101, the check specifics storing portion 102, a conversion phrase storing portion 300, the data storing portion 103, and the clustering result storing portion 104.

The statement unit storing portion 100, the statement storing portion 101, the check specifics storing portion 102, the data storing portion 103, and the clustering result storing portion 104 are the same as in the first (second) embodiment.

The conversion phrase storing portion 300 stores conversion phrases such as synonymous phrases and unnecessary phrases.

Figures 14, 15:
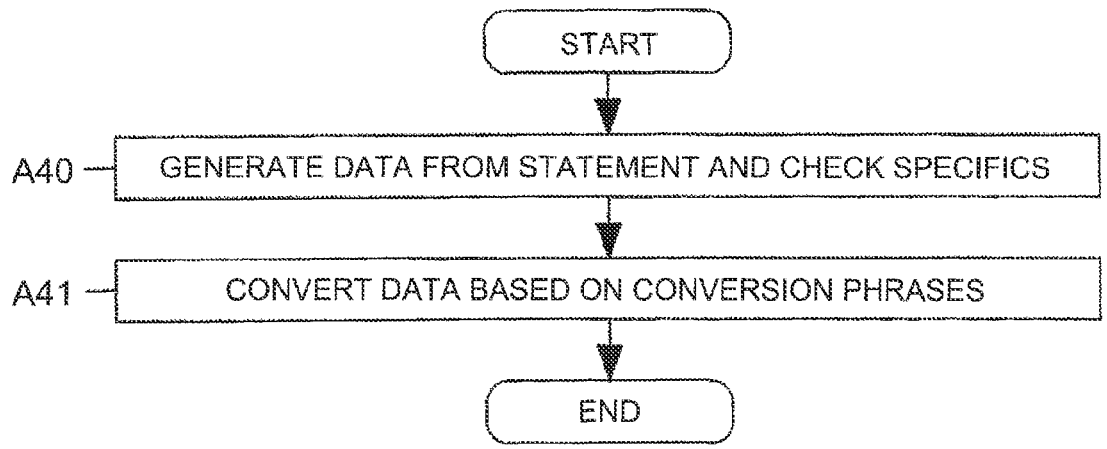
FIG. 14 is an explanatory diagram illustrating an example of conversion phrases that are stored in a conversion phrase storing portion 300 of FIG. 13.
FIG. 15 is a flow chart illustrating an example of the progress of processing that is performed by a data generating portion 301 in the mismatch detection system according to the third embodiment of this invention.

FIG. 14 is an explanatory diagram illustrating an example of conversion phrases that are stored in the conversion phrase storing portion 300. In FIG. 14, the first column holds a converted phrase which serves as a representative phrase of phrases, and the second and subsequent columns hold pre-conversion phrases.

The computing portion 32 includes the statement unit extracting portion 105, the statement constructing portion 106, a data generating portion 301, the clustering portion 108, and a detection portion 302.

The statement unit extracting portion 105, the statement constructing portion 106, and the clustering portion 108 are the same as in the first (second) embodiment.

The data generating portion 301 generates a data set obtained by merging statements stored in the statement storing portion 101 and check specifics stored in the check specifics storing portion 102, converts each piece of data in the data set based on synonymous phrases and unnecessary phrases stored in the conversion phrase storing portion 300, and stores the converted data set in the data storing portion 103.

The detection portion 302 calculates, for a combination of a predetermined check subject and check specifics indicating ambiguousness which are stored in the check specifics storing portion 102, the degree of similarity to a clustering result stored in the clustering result storing portion 104, detects a mismatch based on the calculated degree of similarity, and outputs a detection result to the output portion 33.

A detailed description is given with reference to a flow chart of FIG. 15 in addition to FIG. 13 of the operation of the data generating portion 301 according to the third embodiment.

The data generating portion 301 generates data from a statement stored in the statement storing portion 101 and check specifics stored in the check specifics storing portion 102 (Step A40).

The data generating portion 301 next searches the conversion phrase storing portion 300 for the generated data, converts the data into a converted phrase when there is a pre-conversion phrase that matches, and stores a converted data set in the data storing portion 103 (Step A41).

In the case of FIG. 14, for example, "kayō sei" ("availability") in the data is not converted and remains as it is whereas "availability" is converted into "kayo sei". "Fault tolerance" and "kosyo kyoyō sei" ("fault tolerance") in the data are converted into "tai syogai sei" ("fault tolerance"). A word "tonikaku" ("anyway") in the data is deleted. By thus setting null as the representative word of unnecessary words, an unnecessary word can be deleted by the same operation as the operation for integrating synonymous words. Conversion phrases can be created easily with the use of a general synonym thesaurus and, if a business operation glossary is available, conversion phrases specialized for the business operation can be added. In the case where a Kolmogorov complexity approximation algorithm is used, the degree of similarity is low between a desu/masu-style sentence (a Japanese sentence that ends with "desu" or "masu") and a da/dearu-style sentence (a Japanese sentence that ends with "da" or "dearu"), and conversion phrases for integrating the desu/masu style into the dearu style may be added.

Figures 16, 17:
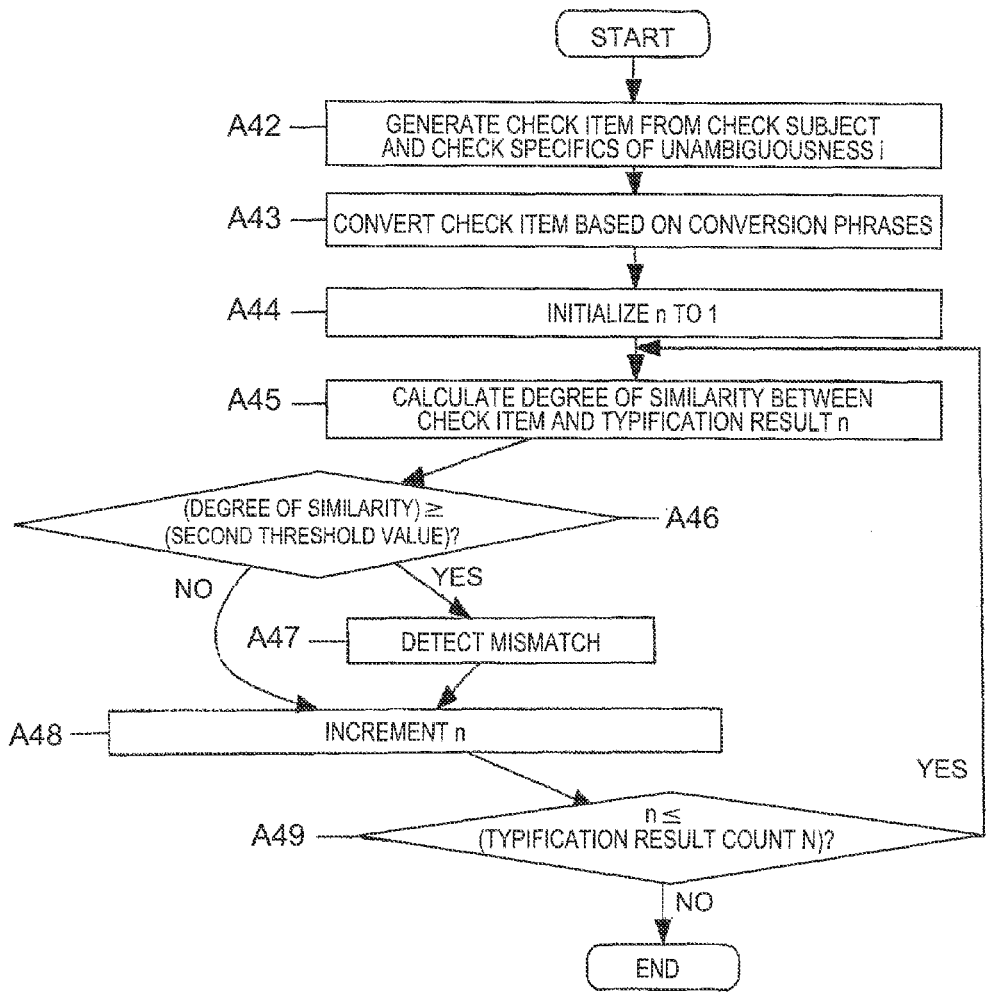
FIG. 16 is a flow chart illustrating an example of the progress of processing that is performed by a detection portion 302 with regard to unambiguousness i of one check subject in the mismatch detection system according to the third embodiment of this invention.
FIG. 17 is an explanatory diagram illustrating an example of check specifics that are stored in the check specifics storing portion 102 of FIG. 13.

A detailed description is given with reference to a flow chart of FIG. 16 in addition to FIG. 13 of the operation of the detection portion 302 with regard to unambiguousness i of one check subject according to the third embodiment.

The detection portion 302 selects check specifics that give unambiguousness i to generate a check item from the check subject and the check specifics (Step A42).

FIG. 17 is an explanatory diagram illustrating an example of check specifics that are stored in the check specifics storing portion 102. As illustrated in FIG. 17, one unambiguousness is associated with one set of check specifics. In the check item generation of Step A42, when the check subject is a null string " " which indicates an arbitrary subject, the segmentation symbol is a null string " ", and detection is conducted with regard to unambiguousness 1, for example, the generated check item is "compatible with functions to be added in the future".

The detection portion 302 next converts the check item based on conversion phrases stored in the conversion phrase storing portion 300 (Step A43). The detection portion 302 searches the conversion phrase storing portion 300 for the check item and, when there is a pre-conversion phrase that matches, converts the check item into a converted phrase. In the case where there is no pre-conversion phrase that matches the check item, the converted check specifics are the same as in the check item prior to conversion.

The detection portion 302 next initializes n (Step A44).

The detection portion 302 calculates the degree of similarity between the check item and the clustering result n (Step A45).

The detection portion 302 next compares the degree of similarity against the second threshold value determined in advance (Step A46). The second threshold value may be specified by a user of the system through an input via the input portion 30 which is a keyboard or the like, or may be stored in the system by default, or may be specified in other manners. The detection portion 200 moves to Step A47 when the degree of similarity is equal to or higher than the second threshold value, and moves to Step A48 when the degree of similarity is lower than the second threshold value.

In Step A47, the detection portion 302 detects a mismatch. The detection result may be output immediately via the output portion 33 which is a display, a printer, or others, or may be stored to be output in response to a request from a user of the system or the like, or may be output in other manners. In order to show places that have ambiguity, the relevant clustering result n may be output concurrently. At this point, a statement corresponding to each piece of data of the clustering result n may be output together with its neighbor statements by referring to the statement storing portion 101, because the input document may be less ambiguous around the ambiguous places, as in "to be compatible with functions to be added in the future. Additional functions with which compatibility is required are a function A and a function B". The neighbor statements are, for example, three lines before and after the statement in question.

In Step A48, the detection portion 302 increments n.

The detection portion 302 next compares n against the clustering result count N (Step A49). The detection portion 302 returns to Step A45 when n is equal to or lower than N, and ends the operation when n is higher than N. Those processing steps of the detection portion 302 can be executed for every unambiguousness i and for various check subjects.

In the third embodiment, the conversion phrase storing portion is added and the data generating portion and the detection portion perform phrase conversion based on conversion phrases stored in the conversion phrase storing portion. The conversion phrase storing portion may be added to perform phrase conversion in the first embodiment and the second embodiment, too. While the first to third embodiments detect completeness, inconsistency, and unambiguousness, respectively, a different check method may be stored in the check specifics storing portion to set a detection portion operation suited to the check method. For example, high-risk check specifics such as "operate 24 hours a day for 365 days without suffering a failure" are determined in advance, and whether a document contains a part similar to the check specifics is detected.

(Effects of the Third Embodiment)

According to the third embodiment, an effect in that a statement mismatch can be detected with high precision without manually converting a document into other formats is obtained as in the first and the second embodiments.

The third embodiment deals with mismatch detection in terms of unambiguousness, and has an effect in that check specifics that create ambiguousness when written can be detected. In addition, the configuration of the third embodiment in which synonymous phrases are converted into a representative phrase of the synonymous phrases and unnecessary phrases are deleted has an effect in that a statement mismatch can be detected even when there are words that have the same meaning but different character strings.

(Fourth Embodiment)

A mismatch detection system according to a fourth embodiment of this invention is described in detail with reference to the drawings. The mismatch detection system according to the fourth embodiment detects a mismatch when a source document and a response document cannot be associated with each other in places. The description given here takes as an example the case where input documents are a source document that is a request for proposal and a response document that is a proposal, or the case where input documents are a source document that is a proposal and a response document that is specifications.

In the case where the source document is a request for proposal, a proposal needs to describe, for each requirement item written in the request for proposal, an implementation means proposal item corresponding to the requirement item. In the case where the source document is a proposal, specifications need to describe, for each proposal item written in the proposal, a requirement item related to the proposal item. The fourth embodiment uses this association of a requirement item with a proposal item, or of a proposal item with a requirement item, to detect a mismatch. Components that are the same as those in the third embodiment are denoted by the same reference numerals, and a detailed description thereof is omitted here.

Figure 18:
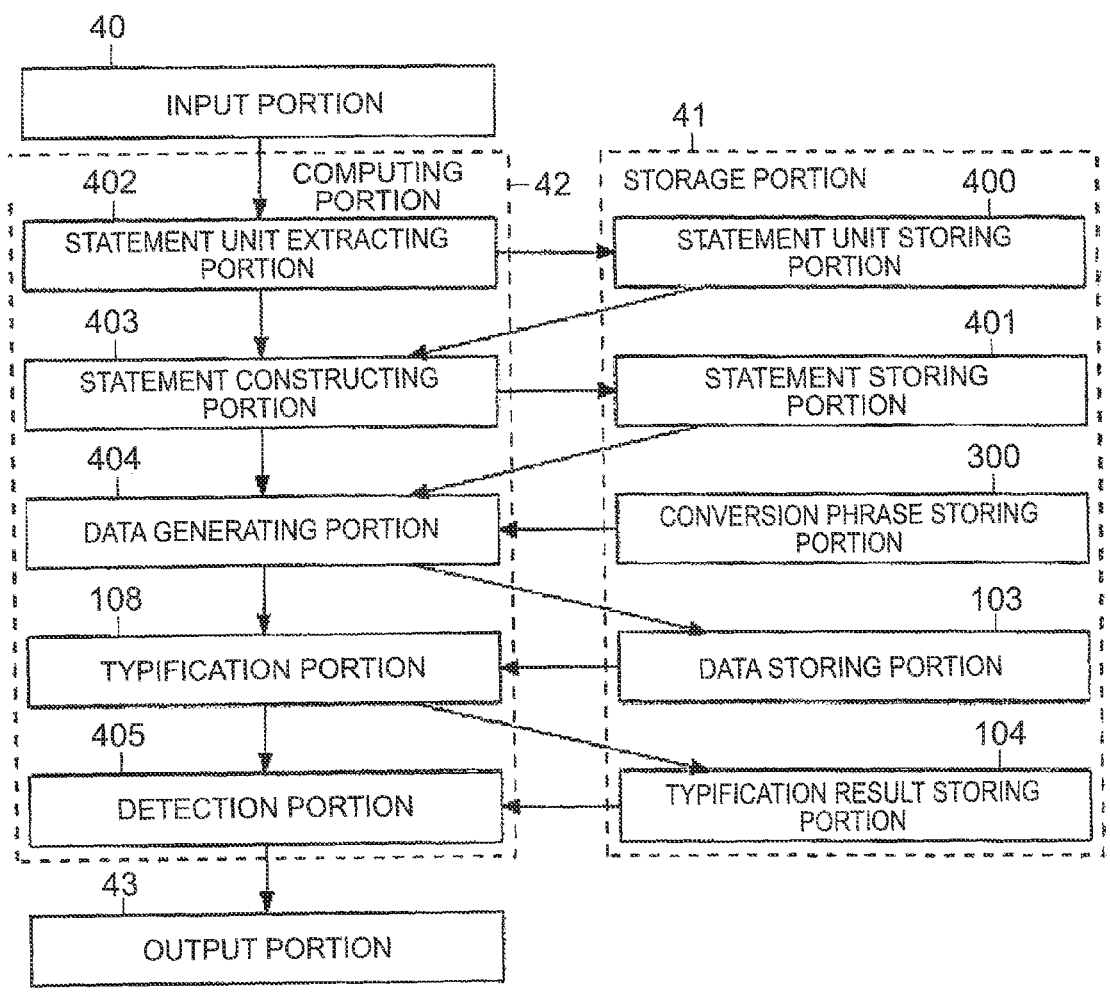
FIG. 18 is a block diagram illustrating a configuration example of a mismatch detection system according to a fourth embodiment of this invention.

Referring to FIG. 18, the mismatch detection system according to the fourth embodiment includes an input portion 40, which is a keyboard or the like, a storage portion 41 for storing information, a computing portion 42, which operates under control of a program, and an output portion 43, which is a display, a printer, or the like.

The storage portion 41 includes a statement unit storing portion 400, a statement storing portion 401, the conversion phrase storing portion 300, the data storing portion 103, and the clustering result storing portion 104.

The statement unit storing portion 400 stores statement units extracted from two documents that are the source document and the response document, such as a request for proposal and a proposal in response to the request for proposal, or a proposal and specifications in response to the proposal.

FIG. 19 is an explanatory diagram illustrating an example of statement units that are stored in the statement unit storing portion 400. As illustrated in FIG. 19, the statement unit storing portion 400 stores an ID indicating a statement unit number, statement unit specifics, and a document ID indicating a document number. The stored document ID of a source document is 1 and the stored document ID of a response document is 2.

The statement storing portion 401 stores a statement as a combination of specifics and a context along with a document ID.

FIG. 20 is an explanatory diagram illustrating an example of statements that are stored in the statement storing portion 401. As illustrated in FIG. 20, the statement storing portion 401 stores a statement as a combination of a context and specifics, together with a document ID.

The conversion phrase storing portion 300, the data storing portion 103, and the clustering result storing portion 104 are the same as in the third embodiment.

A computing portion 42 includes a statement unit extracting portion 402, a statement constructing portion 403, a data generating portion 404, the clustering portion 108, and a detection portion 405.

The statement unit extracting portion 402 formats a source document and a response document, which are input via the input portion 40, divides the documents into pieces to extract statement units, and stores the statement units in the statement unit storing portion 400 together with a document ID.

The statement constructing portion 403 constructs a statement based on statement units stored in the statement unit storing portion 400, and stores a set of statements in the statement storing portion 401 together with document IDs. The data generating portion 404 generates data from statements stored in the statement storing portion 401, converts the data with the use of conversion phrases stored in the conversion phrase storing portion 300, and stores a converted data set in the data storing portion 103.

The clustering portion 108 is the same as in the third embodiment.

The detection portion 405 calculates the degree of similarity between one clustering result stored in the clustering result storing portion 104 and another, and detects a mismatch based on the calculated degree of similarity.

Figure 21:
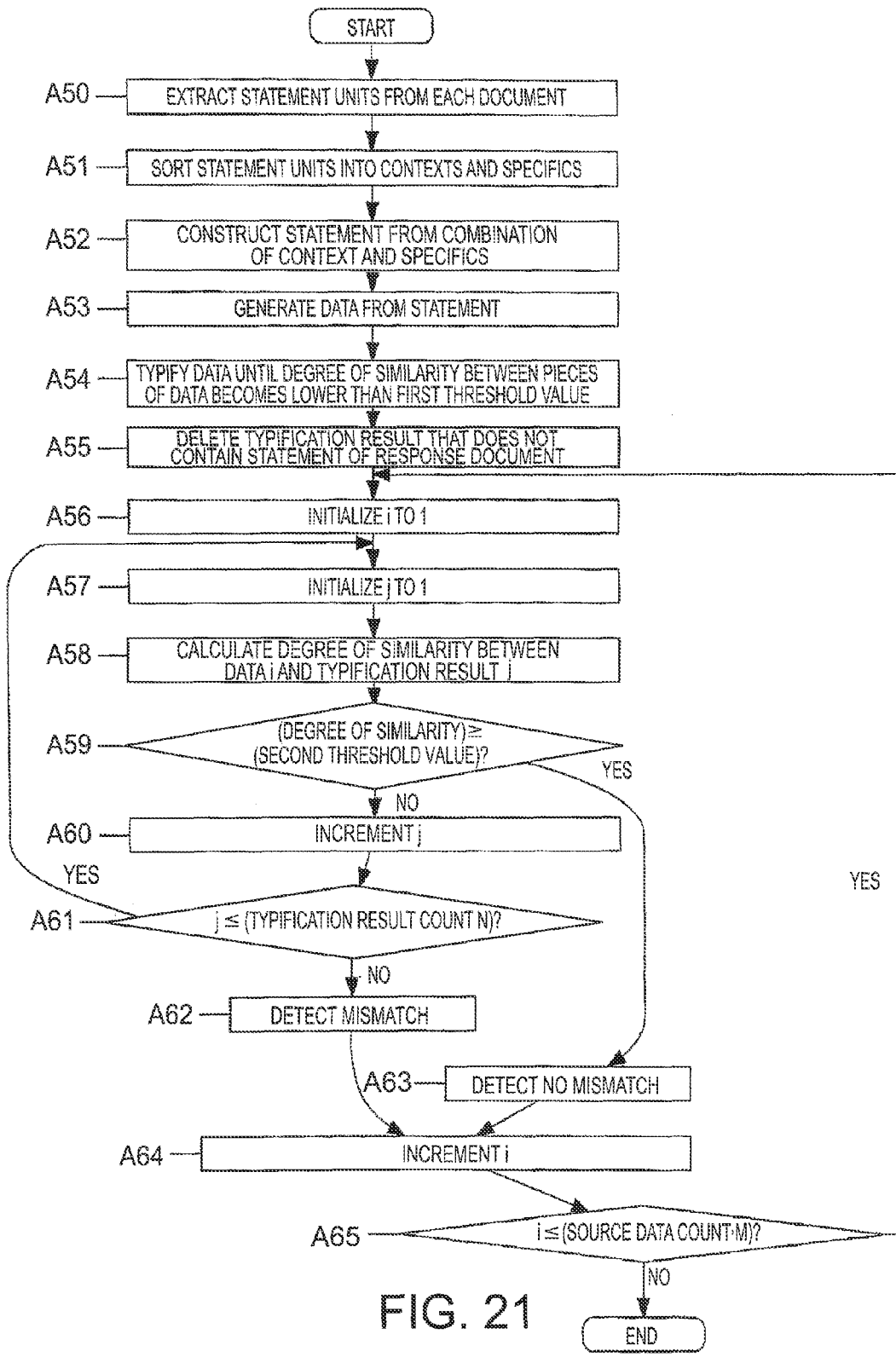
FIG. 21 is a flow chart illustrating an example of the progress of processing in the mismatch detection system according to the fourth embodiment of this invention.

The overall operation according to the fourth embodiment is described in detail with reference to a flow chart of FIG. 21 in addition to FIG. 18.

The statement unit extracting portion 402 formats the source document and the response document, and extracts statement units to store the statement units in the statement unit storing portion 400 (Step A50). The source document and the response document are formatted by, for example, the same method that is used in the first embodiment.

Next, the statement constructing portion 403 sorts statement units into contexts and specifics (Step A51).

The statement constructing portion 403 next constructs a statement as a combination of a context and specifics, and stores the statement in the statement storing portion 401 (Step A52). A statement is constructed only when a context and specifics belong to the same document. For example, requirements of FIG. 20 are constructed from FIG. 19.

Next, the data generating portion 404 generates data from statements stored in the statement storing portion 401, converts the data based on conversion phrases stored in the conversion phrase storing portion 300, and stores the data as a data set in the data storing portion 103 (Step A53). In the fourth embodiment, conversion phrases for associating the source document and the response document may be stored in addition to the conversion phrases of the third embodiment.

FIG. 22 is an explanatory diagram illustrating an example of conversion phrases that are stored in the conversion phrase storing portion 300. As illustrated in FIG. 22, a phrase in a request for proposal such as "without deteriorating response" may be specified in advance as a phrase corresponding to a solving means phrase, "load balancing", in a proposal. A formulaic phrase in a proposal, such as "the point of proposal", may be deleted by determining the phrase as unnecessary in advance.

FIG. 23 is an explanatory diagram illustrating a data set that is stored in the data storing portion 103. Converting statement units of FIG. 19 with the use of FIG. 22 produces FIG. 23.

Next, the clustering portion 108 typifies data until the degree of similarity between pieces of data becomes lower than the first threshold value, and stores clustering results in the clustering result storing portion 104 (Step A54).

The clustering portion 108 next examines sequentially clustering results stored in the clustering result storing portion 104, and when there is a clustering result that contains none of the statements of the response document, deletes the clustering result from the clustering result storing portion 104 (Step A55).

Next, the detection portion 405 initializes i, which is a number indicating data of the source document, to 1 (Step A56).

The detection portion 405 initializes j, which is a number indicating a clustering result, to 1 (Step A57).

The detection portion 405 next calculates the degree of similarity between the data i, which is constructed from the source document, and the clustering result j (Step A58).

The detection portion 405 examines whether the calculated degree of similarity is equal to or higher than the second threshold value (Step A59). The second threshold value may be specified by the user of the system through an input via the input portion 40 which is a keyboard or the like, or may be stored in the system by default, or may be specified in other manners.

The detection portion 405 moves to Step A63 when the degree of similarity is equal to or higher than the second threshold value, and moves to Step A60 when the degree of similarity is lower than the second threshold value.

In Step A60, the detection portion 405 increments j.

The detection portion 405 next compares the number j against the clustering result count N (Step A61). The detection portion 405 returns to Step A58 when j is equal to or lower than N, and moves to Step A62 when j is higher than N.

In Step A62, the detection portion 405 detects a mismatch. The result may be output immediately via the output portion 43 which is a display, a printer, or others, or may be stored to be output in response to a request from the user of the system or the like, or may be output in other manners. Data i indicating a missed item may be output concurrently at this point.

In Step A63, the detection portion 405 detects no mismatch. The result may be output immediately via the output portion 43 which is a display, a printer, or others, or may be stored to be output in response to a request from the user of the system or the like, or may be output in other manners. The detection portion 405 may be instructed not to output "no mismatch" results.

After Step A62, the detection portion 405 increments i (Step A64).

The detection portion 405 next compares the number i against the data count M of the source document (Step A65). The detection portion 405 returns to Step A57 when i is equal to or lower than M, and ends the processing when i is higher than M.

(Effects of the Fourth Embodiment)

According to the fourth embodiment, a statement association is detected from two documents that are a source document and a response document, such as a request for proposal and a proposal in response to the request for proposal, or a proposal and specifications in response to the proposal. The resultant effect is that a missed statement which is written in the source document but is not in the response document can be detected. The fourth embodiment also has an effect in that a statement mismatch can be detected with high precision without manually converting a document into other formats as in the first, second, and third embodiments.

While this invention has been described with reference to the plurality of embodiments, this invention is not limited to the above-mentioned embodiments. Various changes that can be understood by a person skilled in the art can be made to the configuration and details of this invention without departing from the spirit of the invention described in claims.

Further, part or whole of the above-mentioned embodiments can also be described as in the following notes, but this invention is not limited thereto.

(Note 1)

A mismatch detection system, including: a statement unit extracting portion that extracts a set of statement units by dividing a given document, which is written in a natural language, into pieces; a statement constructing portion that constructs each statement as a combination of a context and specifics by sorting each of the statement units into the context, which indicate additional information of statements, and the specifics, which indicate information of the statements; a data generating portion that generates a data set obtained by merging a set of predetermined check specifics and a set of the statements generated by the statement constructing portion; a clustering portion that converts two most similar pieces of data in the generated data set into one new piece of data which is generated by linking the two most similar pieces of data, repeats the conversion to generate a new data set, and extracts, from the generated new data set, only pieces of data that contain the statements generated by the statement constructing portion, to thereby generate a clustering result set; and a detection portion that generates a check item for each combination of a predetermined check subject and check specifics, and detects a mismatch of the statements based on a degree of similarity between the generated check item and a clustering result.

(Note 2)

A mismatch detection system as described in Note 1, in which the statement constructing portion sorts each statement unit as the specifics when the statement unit contains a verb, and as the context when the statement unit does not contain a verb, and generates the statement by linking the specifics and an immediately preceding context with a predetermined segmentation symbol which separates the specifics from the immediately preceding context, and the detection portion generates the check item by linking the predetermined check subject and the check specifics with a predetermined segmentation symbol which separates the predetermined check subject from the check specifics.

(Note 3)

A mismatch detection system as described in Note 1 or 2, in which the clustering portion calculates the degree of similarity between pieces of data based on a Kolmogorov complexity approximation algorithm, and keeps converting the two most similar pieces of data into the one new piece of data by linking the two most similar pieces of data, until the degree of similarity between every two pieces of data becomes lower than a first threshold value determined in advance.

(Note 4)

A mismatch detection system as described in any one of Notes 1 to 3, in which a plurality of sets of check specifics, one of which needs to be written, are determined in advance, and the detection portion creates one check item from a combination of one of the plurality of the sets of check specifics and the predetermined check subject, calculates the degree of similarity for each check item with respect to each clustering result, and detects a mismatch in terms of completeness of the predetermined check subject when every calculated degree of similarity is lower than a second threshold value determined in advance.

(Note 5)

A mismatch detection system as described in any one of Notes 1 to 3, in which a plurality of sets of check specifics which create a contradiction when a plurality of the sets of check specifics are written are determined in advance, and the detection portion generates one check item from a combination of one of the plurality of the sets of check specifics and the predetermined check subject, determines that there is a clustering result corresponding to a check item when the degree of similarity of the check item to any one of clustering results is equal to or higher than a second threshold value determined in advance, and detects a mismatch in terms of inconsistency of the predetermined check subject when two or more of all check items have a corresponding clustering result.

(Note 6)

A mismatch detection system as described in any one of Notes 1 to 3, in which, one or more sets of check specifics are determined in advance as examples of ambiguous statements, and the detection portion generates one check item as a combination of one of the one or more sets of check specifics and the predetermined check subject, and detects a mismatch in terms of unambiguousness of the check item when the degree of similarity to one of clustering results is equal to or higher than a second threshold value.

(Note 7)

A mismatch detection system as described in any one of Notes 1 to 3, in which the statement unit extracting portion extracts the set of statement units from each of two documents including a given source document and a given response document, the data generating portion creates a data set obtained by merging statements constructed from the given source document with statements constructed from the given response document as check specifics, the clustering portion generates the clustering result set by extracting, from a new data generated from the generated data set, only pieces of data that contain the statements constructed from the given response document, and the detection portion detects a mismatch between the two documents when every degree of similarity of each check item that is a statement constructed from the given source document to each clustering result is lower than a second threshold value.

(Note 8)

A mismatch detection system as described in any one of Notes 1 to 7, in which, after generating data, the data generating portion converts the data by a predetermined conversion method, and the detection portion uses the same predetermined conversion method to convert the check item after generating the check item.

(Note 9)

A mismatch detection system as described in any one of Notes 1 to 8, in which the statement unit extracting portion divides a document used in system development or service provision, the document including a request for proposal, a proposal, or specifications, into pieces to extract a set of statement meaning units.

(Note 10)

A mismatch detection method, including: a statement unit extracting step of extracting a set of statement units by dividing a given document, which is written in a natural language, into pieces; a statement constructing step of constructing each statement as a combination of a context and specifics by sorting each of the statement units into the context, which indicate additional information of statements, and the specifics, which indicate information of the statements; a data generating step of generating a data set obtained by merging a set of predetermined check specifics and a set of the statements generated in the statement constructing step; a clustering step of converting two most similar pieces of data in the generated data set into one new piece of data which is generated by linking the two most similar pieces of data, repeating the conversion to generate a new data set, and extracting, from the generated new data set, only pieces of data that contain the statements generated in the statement constructing step, to thereby generate a clustering result set; and a detection step of generating a check item for each combination of a predetermined check subject and check specifics, and detecting a mismatch of the statements based on a degree of similarity between the generated check item and a clustering result.

(Note 11)

A mismatch detection method as described in Note 10, in which the statement constructing step includes sorting each statement unit as the specifics when the statement unit contains a verb, and as the context when the statement unit does not contain a verb, and generating the statement by linking the specifics and an immediately preceding context with a predetermined segmentation symbol which separates the specifics from the immediately preceding context, and the detection step includes generating the check item by linking the predetermined check subject and the check specifics with a predetermined segmentation symbol which separates the predetermined check subject from the check specifics.

(Note 12)

A mismatch detection method as described in Note 10 or 11, in which the clustering step includes calculating the degree of similarity between pieces of data based on a Kolmogorov complexity approximation algorithm, and keeping converting the two most similar pieces of data into the one new piece of data by linking the two most similar pieces of data, until the degree of similarity between every two pieces of data becomes lower than a first threshold value determined in advance.

(Note 13)

A mismatch detection method as described in any one of Notes 10 to 12, in which a plurality of sets of check specifics, one of which needs to be written, are determined in advance, and the detection step includes creating one check item from a combination of one of the plurality of the sets of check specifics and a predetermined check subject, calculating the degree of similarity for each check item with respect to each clustering result, and detecting a mismatch in terms of completeness of the predetermined check subject when every calculated degree of similarity is lower than a second threshold value determined in advance.

(Note 14)

A mismatch detection method as described in any one of Notes 10 to 12, in which a plurality of sets of check specifics which create a contradiction when a plurality of the sets of check specifics are written are determined in advance, and the detection step includes generating one check item from a combination of one of the plurality of the sets of check specifics and the predetermined check subject, determining that there is a clustering result corresponding to a check item when the degree of similarity of the check item to any one of clustering results is equal to or higher than a second threshold value determined in advance, and detecting a mismatch in terms of inconsistency of the predetermined check subject when two or more of all check items have a corresponding clustering result.

(Note 15)

A mismatch detection method as described in any one of Notes 10 to 12, in which one or more sets of check specifics are determined in advance as examples of ambiguous statements, and the detection step includes generating one check item as a combination of one of the one or more sets of check specifics and the predetermined check subject, and detecting a mismatch in terms of unambiguousness of the check item when the degree of similarity to one of clustering results is equal to or higher than a second threshold value.

(Note 16)

A mismatch detection method as described in any one of Notes 10 to 12, in which the statement unit extracting step includes extracting the set of statement units from each of two documents including a given source document and a given response document, the data generating step includes creating a data set obtained by merging statements constructed from the given source document with statements constructed from the given response document as check specifics, the clustering step includes generating the clustering result set by extracting, from a new data generated from the generated data set, only pieces of data that contain the statements constructed from the given response document, and the detection step includes detecting a mismatch between the two documents when every degree of similarity of each check item that is a statement constructed from the given source document to each clustering result is lower than a second threshold value.

(Note 17)

A mismatch detection method as described in any one of Notes 10 to 16, in which, after generating data, the data generating step includes converting the data by a predetermined conversion method, and the detection step includes using the same predetermined conversion method to convert the check item after generating the check item.

(Note 18)

A mismatch detection method as described in any one of Notes 10 to 17, in which the statement unit extracting step includes dividing a document used in system development or service provision, the document including a request for proposal, a proposal, or specifications, into pieces to extract a set of statement meaning units.

(Note 19)

A mismatch detection program for causing a computer to execute: statement unit extracting processing of extracting a set of statement units by dividing a given document, which is written in a natural language, into pieces; statement constructing processing of constructing each statement as a combination of a context and specifics by sorting each of the statement units into the context, which indicate additional information of statements, and the specifics, which indicate information of the statements; data generating processing of generating a data set obtained by merging a set of predetermined check specifics and a set of the statements generated in the statement constructing processing; clustering processing of converting two most similar pieces of data in the generated data set into one new piece of data which is generated by linking the two most similar pieces of data, repeating the conversion to generate a new data set, and extracting, from the generated new data set, only pieces of data that contain the statements generated in the statement constructing processing, to thereby generate a clustering result set; and detection processing of generating a check item for each combination of a predetermined check subject and check specifics, and detecting a mismatch of the statements based on a degree of similarity between the generated check item and a clustering result.

(Note 20)

A mismatch detection program as described in Note 19, in which the mismatch detection program further causes the computer to execute the statement constructing processing including sorting each statement unit as the specifics when the statement unit contains a verb, and as the context when the statement unit does not contain a verb, and generating the statement by linking the specifics and an immediately preceding context with a predetermined segmentation symbol which separates the specifics from the immediately preceding context, and the detection processing including generating the check item by linking the predetermined check subject and the check specifics with a predetermined segmentation symbol which separates the predetermined check subject from the check specifics.

(Note 21)

A mismatch detection program as described in Note 19 or 20, in which the mismatch detection program further causes the computer to execute the clustering processing including calculating the degree of similarity between pieces of data based on a Kolmogorov complexity approximation algorithm, and keeping converting the two most similar pieces of data into the one new piece of data by linking the two most similar pieces of data, until the degree of similarity between every two pieces of data becomes lower than a first threshold value determined in advance.

(Note 22)

A mismatch detection program as described in any one of Notes 19 to 21, in which a plurality of sets of check specifics, one of which needs to be written, are determined in advance, and the mismatch detection program further causes the computer to execute the detection processing including creating one check item from a combination of one of the plurality of the sets of check specifics and a predetermined check subject, calculating the degree of similarity for each check item with respect to each clustering result, and detecting a mismatch in terms of completeness of the predetermined check subject when every calculated degree of similarity is lower than a second threshold value determined in advance.

(Note 23)

A mismatch detection program as described in any one of Notes 19 to 21, in which a plurality of sets of check specifics which create a contradiction when a plurality of the sets of check specifics are written are determined in advance, and the mismatch detection program further causes the computer to execute the detection processing including generating one check item from a combination of one of the plurality of the sets of check specifics and the predetermined check subject, determining that there is a clustering result corresponding to a check item when the degree of similarity of the check item to any one of clustering results is equal to or higher than a second threshold value determined in advance, and detecting a mismatch in terms of inconsistency of the predetermined check subject when two or more of all check items have a corresponding clustering result.

(Note 24)

A mismatch detection program as described in any one of Notes 19 to 21, in which, one or more sets of check specifics are determined in advance as examples of ambiguous statements, and the mismatch detection program further causes the computer to execute the detection processing including generating one check item as a combination of one of the one or more sets of check specifics and the predetermined check subject, and detecting a mismatch in terms of unambiguousness of the check item when the degree of similarity to one of clustering results is equal to or higher than a second threshold value.

(Note 25)

A mismatch detection program as described in any one of Notes 19 to 21, in which the mismatch detection program further causes the computer to execute the statement unit extracting processing including extracting the set of statement units from each of two documents including a given source document and a given response document, the data generating processing including creating a data set obtained by merging statements constructed from the given source document with statements constructed from the given response document as check specifics, the clustering processing including generating the clustering result set by extracting, from a new data generated from the generated data set, only pieces of data that contain the statements constructed from the given response document, and the detection processing including detecting a mismatch between the two documents when every degree of similarity of each check item that is a statement constructed from the given source document to each clustering result is lower than a second threshold value.

(Note 26)

A mismatch detection program as described in any one of Notes 19 to 25, in which the mismatch detection program further causes the computer to execute, after generating data, the data generating processing including converting the data by a predetermined conversion method, and the detection processing including using the same predetermined conversion method to convert the check item after generating the check item.

(Note 27)

A mismatch detection program as described in any one of Notes 19 to 26, in which the mismatch detection program further causes the computer to execute the statement unit extracting processing including dividing a document used in system development or service provision, the document including a request for proposal, a proposal, or specifications, into pieces to extract a set of statement meaning units.

This application claims priority from Japanese Patent Application No. 2010-09123, filed on Apr. 12, 2010, the entire disclosure of which is incorporated herein.

REFERENCE NUMERALS LIST 10, 20, 30, 40 input portion
11, 21, 31, 41 storage portion
12, 22, 32, 42 computing portion
13, 23, 33, 43 output portion

The invention claimed is:

1. A mismatch detection system, comprising
an input portion comprising a device configured to receive an input from a user, the input being a document which is written in a natural language;
a computing portion, comprising a computer processor, configured to process the document; and
an output portion configured to output the processed information, and connected to the computing portion,
wherein the computing portion comprises:
a statement unit extracting portion that extracts a set of statement units by dividing the given document into pieces;
a statement constructing portion that constructs each statement as a combination of a context and specifics by sorting each of the statement units into the context, which indicate additional information of statements, and the specifics, which indicate information of the statements;
a data generating portion that generates a data set obtained by merging a set of predetermined check specifics and a set of the statements generated by the statement constructing portion;
a clustering portion that converts two most similar pieces of data in the generated data set into one new piece of data which is generated by linking the two most similar pieces of data, repeats the conversion to generate a new data set, and extracts, from the generated new data set, only pieces of data that contain the statements generated by the statement constructing portion, to thereby generate a clustering result set; and
a detection portion that generates a check item for each combination of a predetermined check subject and check specifics, and detects a mismatch of the statements based on a degree of similarity between the generated check item and a clustering result, the mismatch constituting a detection result;
wherein the output portion outputs the detection result of the detection portion;
wherein the statement constructing portion:
sorts each statement unit as the specifics when the statement unit contains a verb, and as the context when the statement unit does not contain a verb, and
generates the statement by linking the specifics and an immediately preceding context with a predetermined segmentation symbol which separates the specifics from the immediately preceding context; and
wherein the detection portion generates the check item by linking the predetermined check subject and the check specifics with a predetermined segmentation symbol which separates the predetermined check subject from the check specifics.

2. A mismatch detection system according to claim 1, wherein the clustering portion calculates the degree of similarity between pieces of data based on a Kolmogorov complexity approximation algorithm, and keeps converting the two most similar pieces of data into the one new piece of data by linking the two most similar pieces of data, until the degree of similarity between every two pieces of data becomes lower than a first threshold value determined in advance.

3. A mismatch detection system according to claim 1, wherein a plurality of sets of check specifics, one of which needs to be written, are determined in advance, and the detection portion creates one check item from a combination of one of the plurality of the sets of check specifics and the predetermined check subject, calculates the degree of similarity for each check item with respect to each clustering result, and detects a mismatch in terms of completeness of the predetermined check subject when every calculated degree of similarity is lower than a second threshold value determined in advance.

4. A mismatch detection system according to claim 1, wherein a plurality of sets of check specifics which create a contradiction when a plurality of the sets of check specifics are written are determined in advance, and the detection portion generates one check item from a combination of one of the plurality of the sets of check specifics and the predetermined check subject, determines that there is a clustering result corresponding to a check item when the degree of similarity of the check item to any one of clustering results is equal to or higher than a second threshold value determined in advance, and detects a mismatch in terms of inconsistency of the predetermined check subject when two or more of all check items have a corresponding clustering result.

5. A mismatch detection system according to claim 1, wherein one or more sets of check specifics are determined in advance as examples of ambiguous statements, and the detection portion generates one check item as a combination of one of the one or more sets of check specifics and the predetermined check subject, and detects a mismatch in terms of unambiguousness of the check item when the degree of similarity to one of clustering results is equal to or higher than a second threshold value.

6. A mismatch detection system according to claim 1, wherein the statement unit extracting portion extracts the set of statement units from each of two documents including a given source document and a given response document, the data generating portion creates a data set obtained by merging statements constructed from the given source document with statements constructed from the given response document as check specifics, the clustering portion generates the clustering result set by extracting, from a new data generated from the generated data set, only pieces of data that contain the statements constructed from the given response document, and the detection portion detects a mismatch between the two documents when every degree of similarity of each check item that is a statement constructed from the given source document to each clustering result is lower than a second threshold value.

7. A mismatch detection system according to claim 1, wherein, after generating data, the data generating portion converts the data by a predetermined conversion method, and the detection portion uses the same predetermined conversion method to convert the check item after generating the check item.

8. A mismatch detection method, comprising:
    extracting a set of statement units by dividing a given document, which is written in a natural language, into pieces;
    constructing each statement as a combination of a context and specifics by sorting each of the statement units into the context, which indicate additional information of statements, and the specifics, which indicate information of the statements;
    generating a data set obtained by merging a set of predetermined check specifics and a set of the statements generated in the constructing of the each statement;
    converting two most similar pieces of data in the generated data set into one new piece of data which is generated by linking the two most similar pieces of data, repeating the conversion to generate a new data set, and extracting, from the generated new data set, only pieces of data that contain the statements generated in the constructing of the each statement, to thereby generate a clustering result set; and
    generating a check item for each combination of a predetermined check subject and check specifics, and detecting a mismatch of the statements based on a degree of similarity between the generated check item and a clustering result,
    wherein the constructing of the each statement sorts each statement unit as the specifics when the statement unit contains a verb, and as the context when the statement unit does not contain a verb, and generates the statement by linking the specifics and an immediately preceding context with a predetermined segmentation symbol which separates the specifics from the immediately preceding context, and the detecting of the mismatch generates the check item by linking the predetermined check subject and the check specifics with a predetermined segmentation symbol which separates the predetermined check subject from the check specifics.

9. A non-transitory computer readable medium storing a program for causing a computer to execute: statement unit extracting processing of extracting a set of statement units by dividing a given document, which is written in a natural language, into pieces; statement constructing processing of constructing each statement as a combination of a context and specifics by sorting each of the statement units into the context, which indicate additional information of statements, and the specifics, which indicate information of the statements; data generating processing of generating a data set obtained by merging a set of predetermined check specifics and a set of the statements generated in the statement constructing processing; clustering processing of converting two most similar pieces of data in the generated data set into one new piece of data which is generated by linking the two most similar pieces of data, repeating the conversion to generate a new data set, and extracting, from the generated new data set, only pieces of data that contain the statements generated in the statement constructing processing, to thereby generate a clustering result set; and detection processing of generating a check item for each combination of a predetermined check subject and check specifics, and detecting a mismatch of the statements based on a degree of similarity between the generated check item and a clustering result,
    wherein the statement constructing processing sorts each statement unit as the specifics when the statement unit contains a verb, and as the context when the statement unit does not contain a verb, and generates the statement by linking the specifics and an immediately preceding context with a predetermined segmentation symbol which separates the specifics from the immediately preceding context, and the detecting processing generates the check item by linking the predetermined check subject and the check specifics with a predetermined segmentation symbol which separates the predetermined check subject from the check specifics.

* * * * *